(12) United States Patent
Endo et al.

(10) Patent No.: US 6,873,905 B2
(45) Date of Patent: Mar. 29, 2005

(54) COMMUNICATIONS TYPE NAVIGATION DEVICE

(75) Inventors: Yoshinori Endo, Mito (JP); Michio Morioka, Hitachi (JP); Kozo Nakamura, Hitachiota (JP); Kimiya Yamaashi, Hitachi (JP); Takaharu Ishida, Hitachinaka (JP); Shigeru Matsuo, Hitachinaka (JP); Kimiyoshi Machii, Hitachi (JP); Katsuaki Tanaka, Hitachi (JP)

(73) Assignees: Opnext Japan, Inc., Yokohama (JP); Xanavi Informatics Corporation, Zama (JP)

( * ) Notice: Subject to any disclaimer, the term of this patent is extended or adjusted under 35 U.S.C. 154(b) by 0 days.

(21) Appl. No.: 10/100,001

(22) Filed: Mar. 19, 2002

(65) Prior Publication Data

US 2004/0204829 A1 Oct. 14, 2004

(51) Int. Cl.$^7$ .............................. H04B 7/26; G01C 2/34; G08G 1/123
(52) U.S. Cl. ..................... 701/202; 701/211; 340/995
(58) Field of Search .......................... 701/202, 211, 701/209, 24, 212, 208, 200, 201; 340/995, 990, 988, 953, 994, 460; 704/275, 246, 270, 274

(56) References Cited

U.S. PATENT DOCUMENTS

| | | | | |
|---|---|---|---|---|
| 5,652,706 A | * | 7/1997 | Morimoto et al. | 364/449.4 |
| 5,956,684 A | * | 9/1999 | Ishii et al. | 704/275 |
| 6,052,645 A | * | 4/2000 | Harada | 701/212 |
| 6,061,003 A | * | 5/2000 | Harada | 340/995.15 |
| 6,088,652 A | * | 7/2000 | Abe | 701/208 |
| 6,104,316 A | * | 8/2000 | Behr et al. | 340/995 |
| 6,107,944 A | | 8/2000 | Behr et al. | 340/995 |
| 6,148,261 A | | 11/2000 | Obradovich et al. | 701/208 |
| 6,202,025 B1 | * | 3/2001 | Harada | 340/995.18 |
| 6,208,932 B1 | * | 3/2001 | Ohmura et al. | 701/200 |
| 6,246,958 B1 | * | 6/2001 | Hirono | 701/208 |
| 6,249,740 B1 | * | 6/2001 | Ito et al. | 701/200 |
| 6,292,745 B1 | * | 9/2001 | Robare et al. | 701/208 |
| 6,321,158 B1 | | 11/2001 | DeLorme et al. | 701/201 |
| 6,345,230 B1 | * | 2/2002 | Hiyokawa et al. | 701/209 |
| 6,385,538 B1 | * | 5/2002 | Yokota | 701/211 |
| 6,415,224 B1 | * | 7/2002 | Wako et al. | 701/208 |
| 6,466,869 B2 | * | 10/2002 | Yamashita et al. | 701/211 |
| 2002/0128768 A1 | * | 9/2002 | Nakano et al. | 701/202 |

FOREIGN PATENT DOCUMENTS

| | | |
|---|---|---|
| EP | 1102228 A2 * | 5/2001 |
| JP | A-2000-55682 | of 0000 |
| JP | 2000348052 | 12/2000 |

* cited by examiner

Primary Examiner—Tan Q. Nguyen
Assistant Examiner—Dalena Tran
(74) Attorney, Agent, or Firm—Antonelli, Terry, Stout & Kraus, LLP

(57) ABSTRACT

There is provided a communications-type car navigation system including a vehicle-mounted terminal and a server. When transferring, to the terminal, the result of a route searching which the server has performed, the server transfers the data that will satisfy the requirements of a route guiding method which the user wishes. Also, the server transfers the route data that has been compressed. Concerning the map data as well, the server transfers only the necessary attributes thereof. Moreover, the following conditions allow the operability to be enhanced: the selection of a map transferring method and the route guiding method where the driving state has been taken into consideration, and the selection of a guiding unit which the user wishes.

17 Claims, 37 Drawing Sheets

FIG. 6

(1) THE ROUTE CALCULATION IS UNDER WAY AT THE NAVI-SERVER

THE CALCULATION IS UNDER WAY AT THE CENTER. PLEASE WAIT FOR A WHILE.

⇩

(2) THE ENTIRE ROUTE IS AUTOMATICALLY DISPLAYED WHEN THE ROUTE SEARCHING HAS BEEN FINISHED

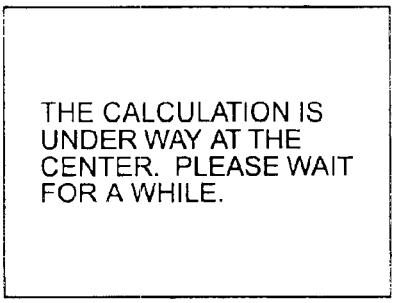

3100

⇩

(3) THE "DECISION" INPUTTING IS AWAITED

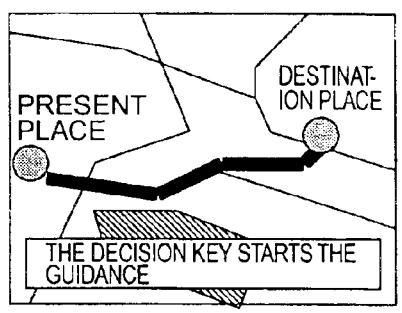

⇩ DECISION (4) PUSHING DOWN THE "DECISION" KEY STARTS THE GUIDANCE

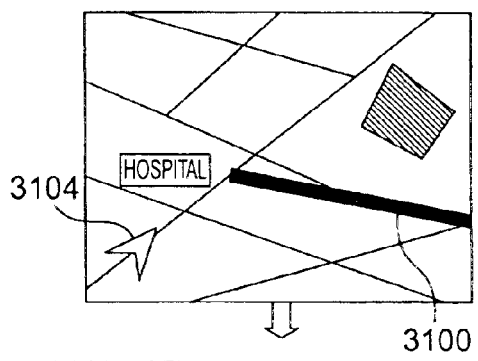

3104

3100

⇩

(5) THE SELF-VEHICLE MOVES ONTO THE ROUTE

3104

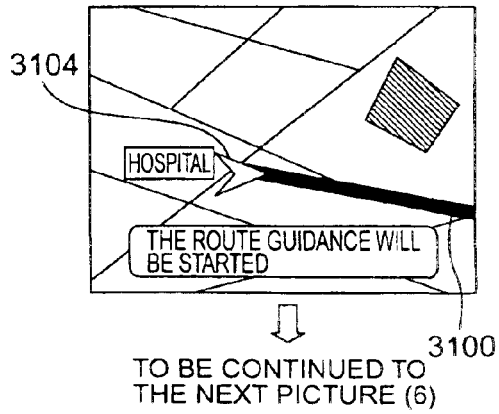

⇩ 3100

TO BE CONTINUED TO THE NEXT PICTURE (6)

FIG. 7
(6) THE GUIDING PICTURE IS AUTOMATICALLY DISPLAYED DURING THE ROUTE GUIDANCE
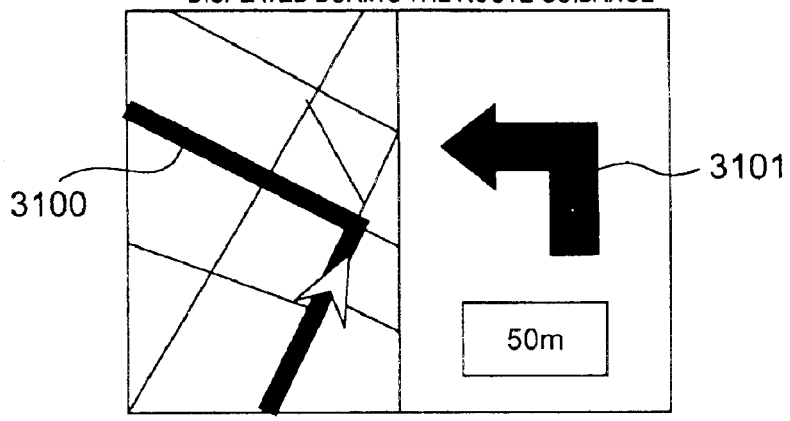
(7) THE COMPLETION OF THE ROUTE GUIDANCE IS NOTICED
(8) 10 SECONDS AFTER
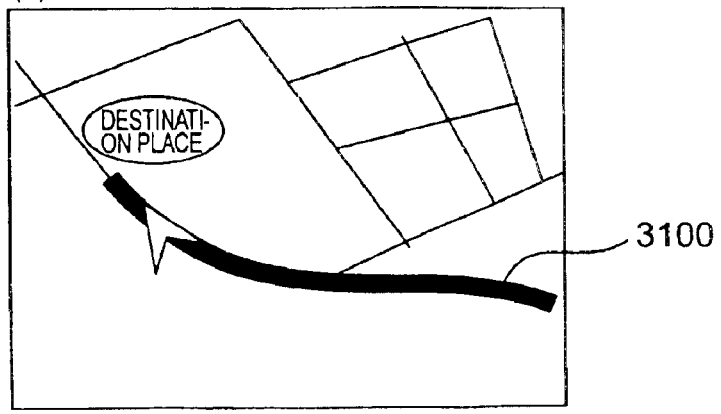

FIG. 19

(a) STATE OR PREFECTURE LIST HTML

```
〈html〉
〈head〉
〈title〉see〈/title〉
〈/head〉

〈body〉
〈h2〉genre: see〈/h2〉
〈h3〉specifying whether destination place is
state or prefecture, or present location's surroundings〈/h3〉
〈table border=1 width=**〉
〈tr〉
〈td〉〈a href=***.nav〉 present location's surroundings〈/a〉〈/td〉
〈td〉〈a href=***. cgi?cat=watch&pops=hokkaido〉 hokkaido〈/a〉〈/td〉
〈td〉〈a href=***. cgi?cat=watch&pops=aomori prefecture〉aomori
prefecture〈/a〉〈/td〉

〈/tr〉
〈/table〉
〈/body〉
〈/html〉
```

2021

(b) NAVI-APPLICATION FILE

```
〈command〉SEARCH_POI〈/command〉
〈cgi_url〉http://servername/cginame?cat=watch〈/cgi_url〉
```

POI LIST HTML

```
<html>
<head>
<title> golf course: ibaragi prefecture </title>
</head>

<body>
<h2> genre: golf course </h2>
<h2> ibaragi prefecture </h2>
<table border=1 width=**>
<tr>
<td><a href=***.nav> ayukawa CC </a></td>
<td><a href=***.nav> hitachi CC </a></td>

</tr>
</table>
</body>
</html>
```

2031

NAVI-APPLICATION FILE

```
<command> DISPLAY POSITION </command>
<lat> 35.22.68 </lat>
<lon> 141.56.96 </lon>
```

```
<html>
  <head>
    <title> route searching result </title>
  </head>

<body>
    <embed src=*** type=application/x-route></embed>
  </body>
</html>
```

2041

ASSIGNMENT OF VOICE DATA ID

FIG. 29
(a) MAIN MENU DISPLAY
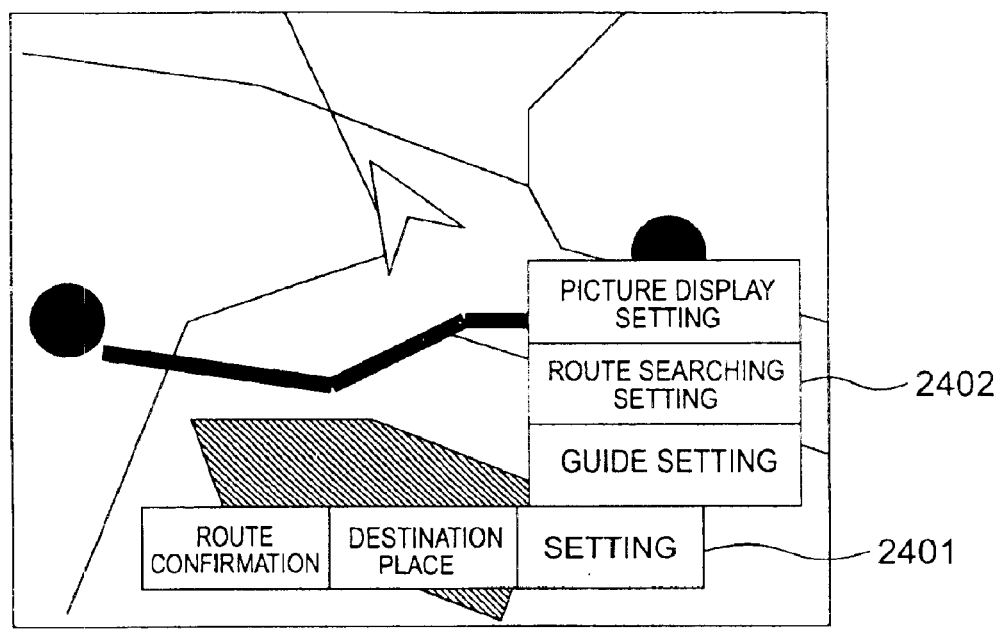
(b) ROUTE SEARCHING SETTING MENU
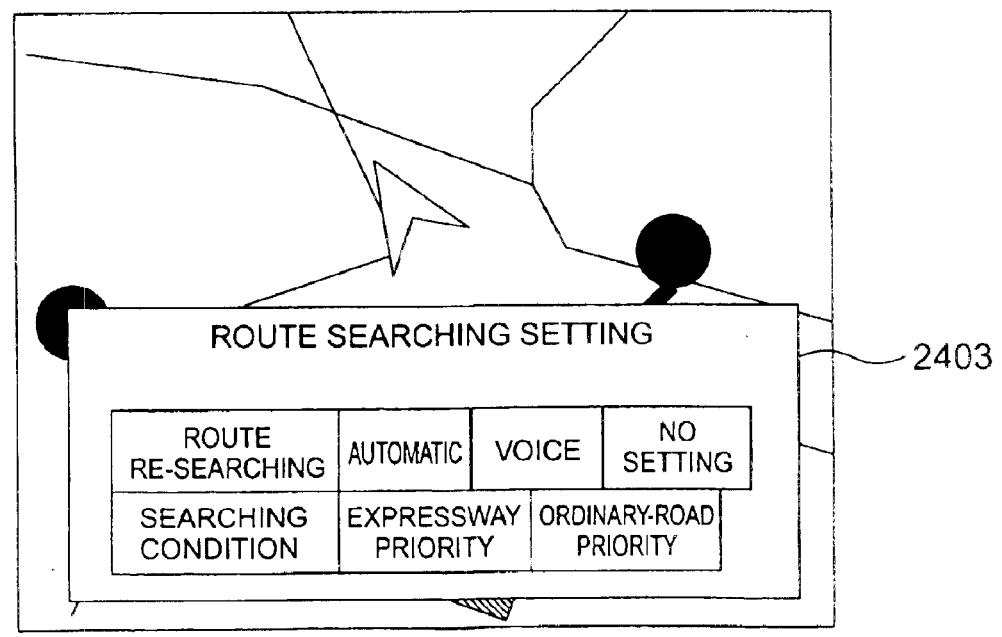

COMMUNICATIONS TYPE NAVIGATION DEVICE

BACKGROUND OF THE INVENTION

1. Field of the Invention

The present invention relates to a vehicle-mounted navigation system, and more particularly to a navigation system based on a scheme where communications are performed between a vehicle-mounted terminal and a server.

2. Description of the Prior Art

In JP-A-2000-55682, there has been disclosed a navigation system of the following type: A server transfers a map and a guiding route to a vehicle-mounted device, and the vehicle-mounted device performs the navigation using these pieces of information. In this system, at first, the vehicle-mounted device transmits a starting place and a destination place to the server, and the server calculates and determines the guiding route therebetween. After that, the server transfers the route and a map of the route's portion to the vehicle-mounted device, and the vehicle-mounted device performs the route guidance while displaying the map.

In the above-described technology, however, no consideration has been given to a method of controlling the display picture at the time of the route guidance and a reduction in the data transfer amount. Also, no consideration has been given to the operability, e.g., an operation in the case where the vehicle-mounted terminal deviates from the guiding route, or a delivery of the map where the safety during the driving has been taken into account. Moreover, no disclosure has been made concerning a method of grasping a cost needed for the data communications and a charge at the time of downloading the contents.

SUMMARY OF THE INVENTION

It is a 1st object of the present invention to provide a vehicle-mounted terminal and a server that allow a communications-type car navigation system to be implemented with a small data transfer amount.

Also, it is a 2nd object thereof to provide a vehicle-mounted terminal and a server that allow the implementation of a communications-type car navigation system that aims at an enhancement in the operability.

Also, it is a 3rd object thereof to provide a vehicle-mounted terminal and a server that allow the implementation of a communications-type car navigation system for indicating the cost for the data communications and the contents charge in a manner that is easy for the user to understand.

The above-described 1st object is accomplished in the following way: When the server transfers, to the terminal, the route guidance data that the server has calculated, a configuration is employed where the user is permitted to select a guiding method from among a plurality of guiding methods. In addition, the server, based on this selection, transfers the route guidance data to the terminal, and the terminal displays the guiding picture. Also, the 1st object is accomplished as well by employing a configuration of transferring only the map data and the route guidance data of a type that the user wishes. Furthermore, the 1st object is accomplished as well by caching these pieces of data into the terminal, or by transferring these pieces of data in a state of being compressed.

The above-described 2nd object is accomplished by a transferring method of a map and route information where the driving state has been taken into consideration, a route guiding method where the driving state has been taken into consideration, and the selection of a guiding unit that the user wishes.

The above-described 3rd object is accomplished in the following way: A unit for calculating the communications charge and the contents charge is provided at the server. Moreover, a unit for displaying these charges is provided at the terminal.

The other objects, features, and advantages of the invention will become apparent from the following description of the embodiments of the invention taken in conjunction with the accompanying drawings.

BRIEF DESCRIPTION OF THE DRAWINGS

FIG. 6 is a diagram for illustrating an example of the picture transition at the time of performing a route guidance;

FIG. 7 is a diagram for illustrating an example of the picture transition at the time of performing a route guidance subsequent to the route guidance in FIG. 6;

FIG. 19 is a diagram for illustrating a transmission format of point-of-interest information;

FIG. 20 is a diagram for illustrating a transmission format of point-of-interest information;

FIG. 21 is a diagram for illustrating a transmission format of a route searching result;

FIG. 29 is a diagram for illustrating setting pictures at the navigation terminal;

DESCRIPTION OF THE EMBODIMENTS

Figure 1:
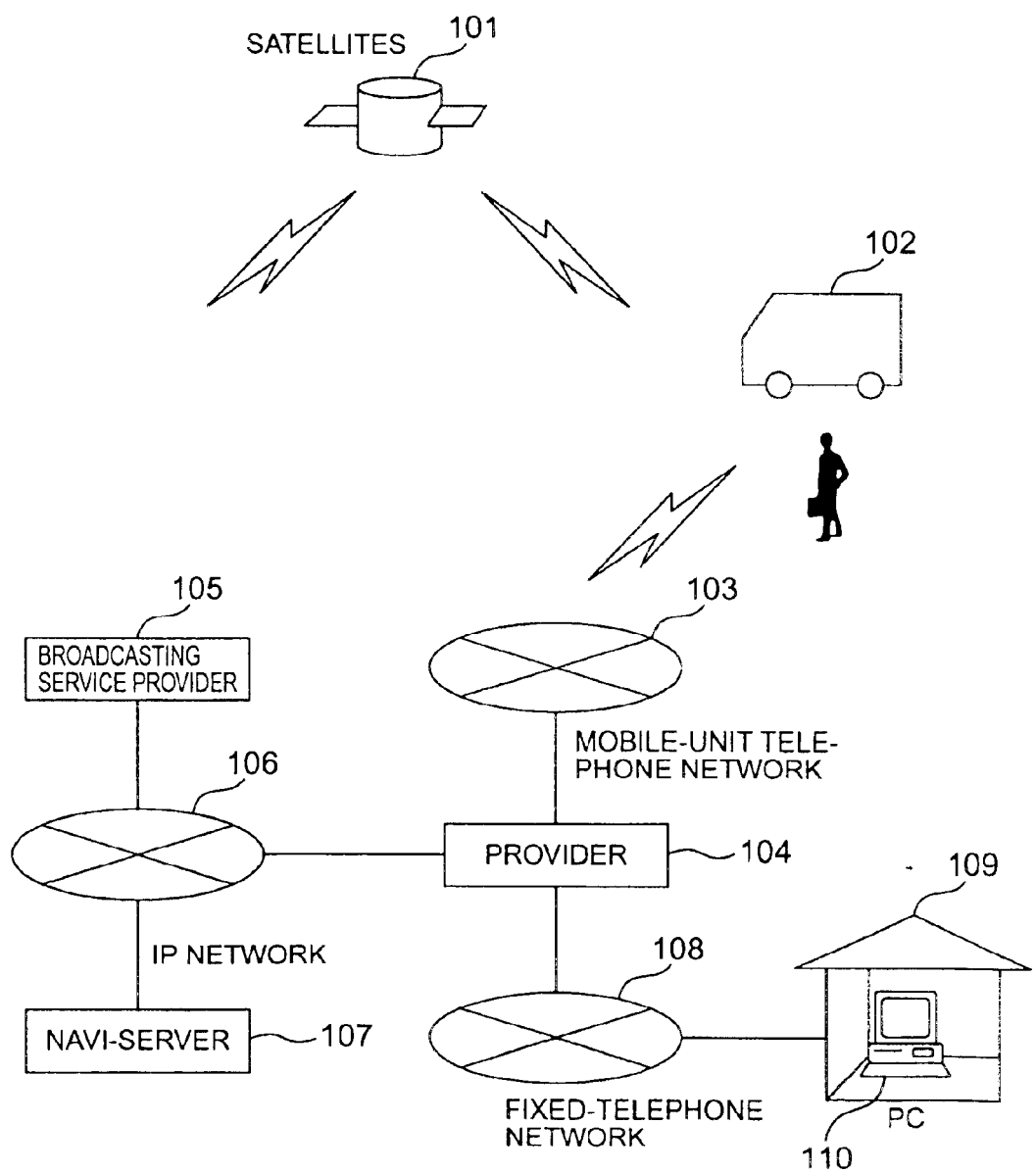
FIG. 1 is an entire system diagram of a communications-type navi-device.

Next, referring to the drawings, the explanation will be given below concerning the details of a communications-type navigation device according to the present invention. FIG. 1 is a diagram for illustrating the entire system of the communications-type navi-device according to the present invention. The entire system according to the present invention includes the following configuration components: Satellites 101, a user vehicle 102 on which a user terminal is mounted, a mobile-unit communications network 103, a provider 104 for establishing the connection with the Internet, a broadcasting service provider 105 for receiving data transmitted from the satellites and delivering the data to the user via an IP network 106, a navi-information providing device 107 (which, in some cases, is described as "a navi-server") for establishing the connection with the IP network 106 so as to transmit/receive the data delivered between the broadcasting service provider 105 and the provider 104, a fixed-telephone network 108 for establishing the connection with the provider so as to perform the transmission/reception of the data via the IP network or the mobile-unit communications network, each user's home 109, and a personal computer 110 existing at each user's home.

Figure 2:
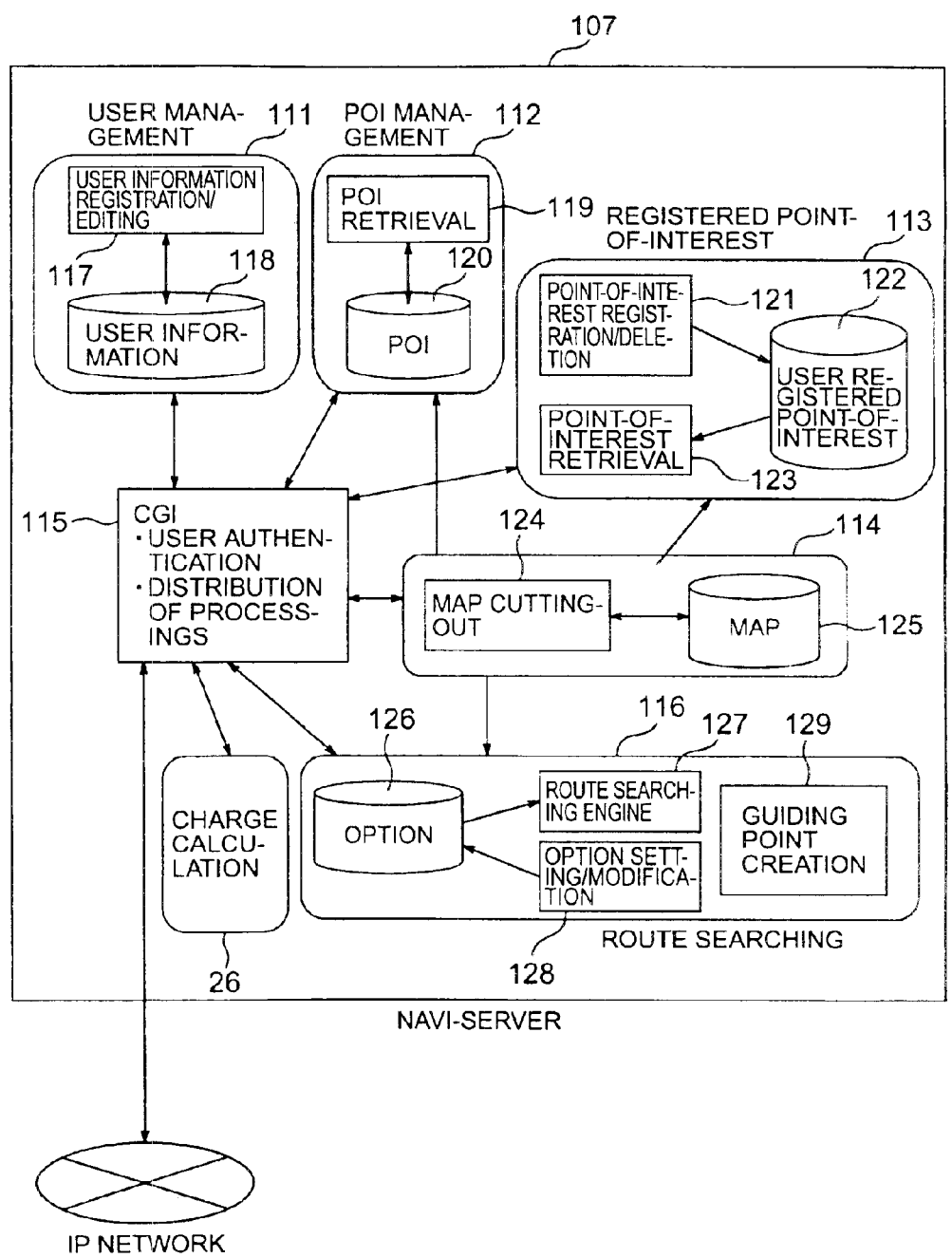
FIG. 2 is a configuration diagram of a navi-information providing device.

Next, referring to FIG. 2, the explanation will be given below regarding the contents of the above-described navi-information providing device (i.e., the navi-server) 107. At first, the navi-information providing device 107 receives the following information transmitted via the IP network 106: A combination of the parameters for indicating the state of the user vehicle mounting thereon the user terminal, e.g., information on the latitude/longitude, the moving speed, the moving direction, the ID number, the authentication password of the user terminal, and the number of revolutions of the vehicle's engine, and the data concerning a requested service. After that, after a CGI (i.e., Common Gate Interface) 115 has performed the user authentication, the data, depending on the requested service from the user, is transmitted to a function unit for performing any one of a user management 111, a POI (point of interest) management 112, a registered point-of-interest 113, a map management 114, and a route searching 116. The data received at each function unit, as information on the service that meets the user's request, is transmitted to the user vehicle via a route of the CGI 115, the IP network 106, the provider 104, and the mobile-unit communications network 103 (hereinafter, this route will be referred to as "a communications network"). Otherwise, in the case where the use of a broadcasting brings about a cost-reduction in transmitting the information on the above-described service, the information is transmitted to the user vehicle via a route of the CGI 115, the IP network 106, the broadcasting service provider 105, and the satellites 101 (hereinafter, this route will be referred to as "a broadcasting network").

Next, the explanation will be given below regarding the configurations of the above-described function units. The user management function unit 111 includes a user management database 118 and a user information registering/editing application 117. If the user's request in the data transmitted from the user is a user information registration/editing, the function unit 111 makes a comparison between the data and the user management database 118 on the basis of the corresponding user ID, thereby performing the registration/editing of the corresponding item.

If the user issues a POI information acquiring request, the POI management function unit 112 retrieves point-of-interest information on the periphery of the user's location from a POI database 120 with the use of a POI retrieval 119, then delivering its result to the user vehicle via the above-described broadcasting network or communications network. Here, the number of the POIs to be delivered has been registered in advance on each user basis, or the user may specify a maximum value of the number when requesting the POIs.

The registered point-of-interest function unit 113 is a function unit in which the user has registered information such as a destination, a favorite site, and a spot that the user had visited in the past, and in which the user can freely register or delete the information. The function unit 113 includes the following configuration components: A user registered point-of-interest database 122 for storing point-of-interest information (such as the point-of-interest's latitude/longitude, name, characteristics, and the others, e.g., the comments, image information, and voice information on the point-of-interest) registered on each user basis, a point-of-interest retrieval 123 for retrieving a point-of-interest that had been registered in the past in accordance with a user's request, and a point-of-interest registering/deleting function 121, i.e., an application by which the user performs the registration/deletion of the point-of-interest. The trigger for the processing at a registration point-in-time is either a user's request made via the CGI 115 or a request made from a map editing function unit 114 that will be described later.

The map editing function unit 114 includes a map database 125 and a map cutting-out application 124. If the user transmits a map data downloading request along with information on the latitude/longitude where the user exists at the present point-in-time, the function unit 114, using the map cutting-out function 124 and from the map database 125, cuts out the map data existing in a range determined in advance, then transmitting the map data to the user. At this time, instead of simply transmitting only the map data to the user, it is also possible to simultaneously cutting-out the above-described POI or registered point-of-interest information that exists within the range in the map data, and to transmit the data to the user. Also, if a route searching function unit 116 that will be described later is invoked, in the case where the map data on the searched route has been not downloaded onto the terminal-side, the map cutting-out function unit is invoked automatically, then cutting out and downloading the map of the corresponding area.

The route searching function unit 116 includes an optional information database 126, a route searching engine 127, an optional information setting/modifying application 128, and a guiding point creating application 129. After the CGI 115 has authenticated the user, a guiding point is created based on the data transmitted from the user, e.g., the destination place information, the presence or absence of an option, and the like. In creating the guiding point, based on the optional information (e.g., the user uses a general road in many cases, the user selects a route along which it takes the user as little time as possible, or the like) that the user has specified, information needed to create an optimum guiding point is searched from the optional information database 126, then causing its result to be reflected on the guiding point creating application.

A charge calculating unit 26 is a unit for performing a service-charge billing processing to the vehicle-mounted terminal. The charge calculating unit has a function of billing charges for the contents such as the map data and the POI data, and a function of counting packets of the communications data so as to inform the vehicle-mounted terminal of the communications charge.

Next, referring to FIG. 3, the explanation will be given below concerning one example of the configuration of the navi-terminal device. The navi-terminal includes a display device 130, a GPS receiver 131, a main body 132, a memory card slot 133, a mobile phone 134, a remote controller 135, and a microphone 137. The display device 130 is a device capable of displaying graphics such as a liquid crystal picture. The GPS receiver 131 is a device for receiving positioning-signals from the plurality of GPS satellites 136 so as to precisely calculate the position of the navi-terminal. The main body 132 is a device inside which there are mounted a CPU, a memory, a power-supply, and a graphics-displaying device. The details of the main body will be explained later, using FIG. 4. The mobile phone 134 is a device for performing the communications with the outside, i.e., the data transmission/reception with the above-described navi-information providing device 107. The remote controller 135 is a device for transmitting, with a button, an operation that the user wishes to perform to the navi-terminal. Also, the use of the microphone 137 makes it possible to send a command with a voice.

The memory card slot 133 is a device to which an external storage device is connected for storing the received data from the above-described navi-information providing device 107, or for loading onto the navi-terminal the information downloaded from the navi-information providing device in the past. The memory card slot 133 is usable as a mere storage device, or is usable for the authentication of the user information for receiving the communications or the broadcasting. For example, when the vehicle on which the present navi-terminal device is mounted is a vehicle such as a rental car that a large number of unspecified users use, a user can utilize the service by inserting, into the memory card slot, a memory card into which the authentication information has been written. Also, by setting an upper-limit amount of money with which the user can enjoy the service offered by the navi-terminal, the user can utilize a service that meets the user's budget. Also, downloading the map at a starting point-of-interest in advance allows the user to save the time and labor of downloading the map from the navi-information providing device 107 at the initial state. Also, the user beforehand writes, into the memory card, services that the user had utilized, then uploading the services onto the navi-information providing device 107 on a fixed-period basis. Next, the navi-information providing device-side analyzes the services. This makes it possible to perform the delivery of the point-of-interest information (POIs) that is to the user's taste.

Figure 3:
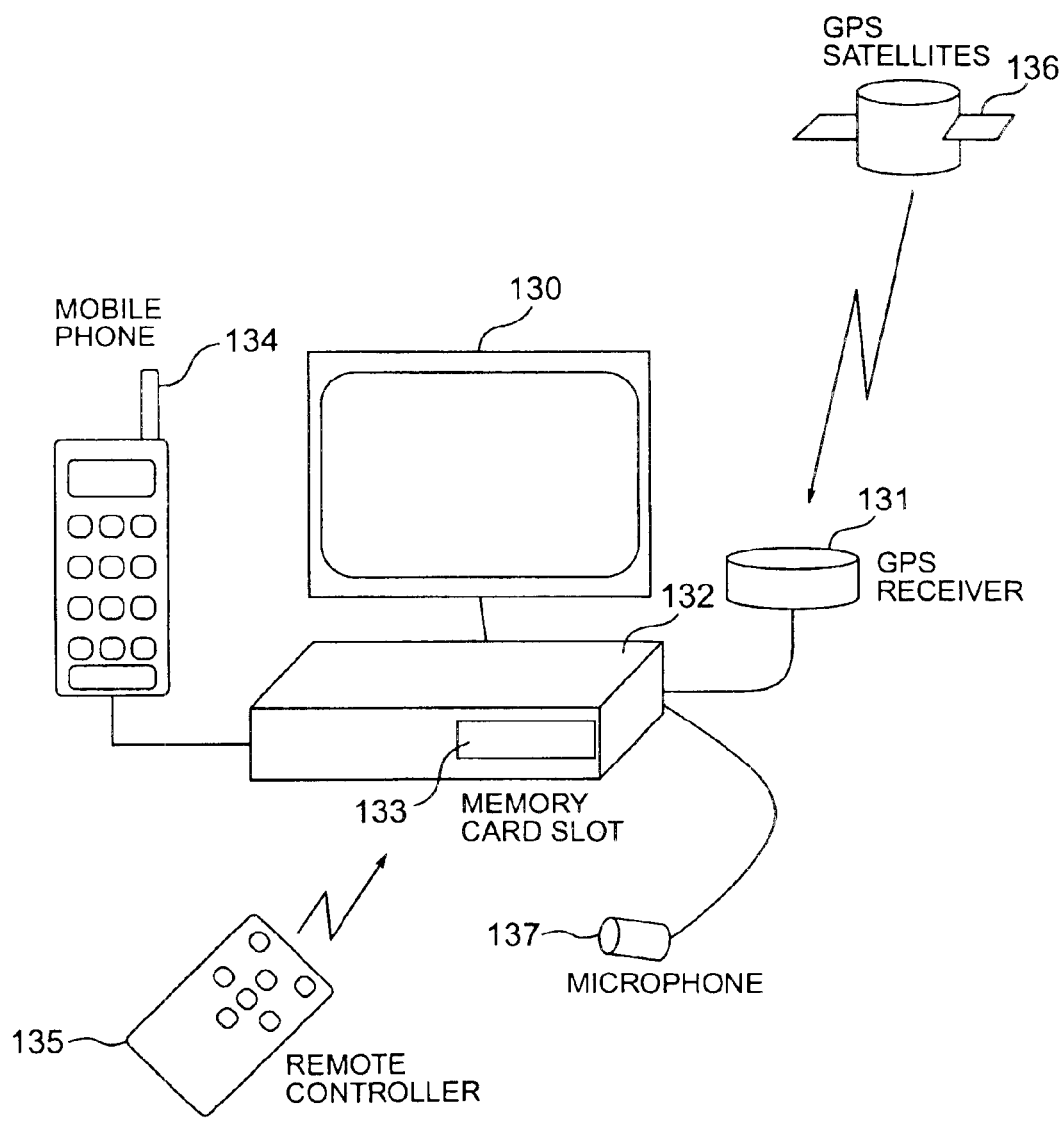
FIG. 3 is a configuration diagram of a navi-terminal device.

Although, in the configuration in FIG. 3, the mobile phone 134 has been used as the communications appliance, the use of another communications appliance, e.g., a PDA or a modem integrated with the main body 132, is also allowable. Also, instead of the mobile phone 134, an intra-vehicle LAN (i.e., Local Area Network) is connectable. Also, in place of the GPS receiver 131, a position-identifying service using PHS (i.e., Personal Handyphone System) is usable. Also, the configuration in FIG. 3 is a configuration of having assumed the case where the data reception from the navi-information providing device 107 is performed using the communications network. In addition to this configuration, the configuration is also possible where the following are added to the main body 132: A receiver that can receive the broadcasting radio wave from the satellites, a broadcasting radio wave using a ground-wave digital, or a broadcasting radio wave using an FM radio wave, and a device for decoding the received data.

Figure 4:
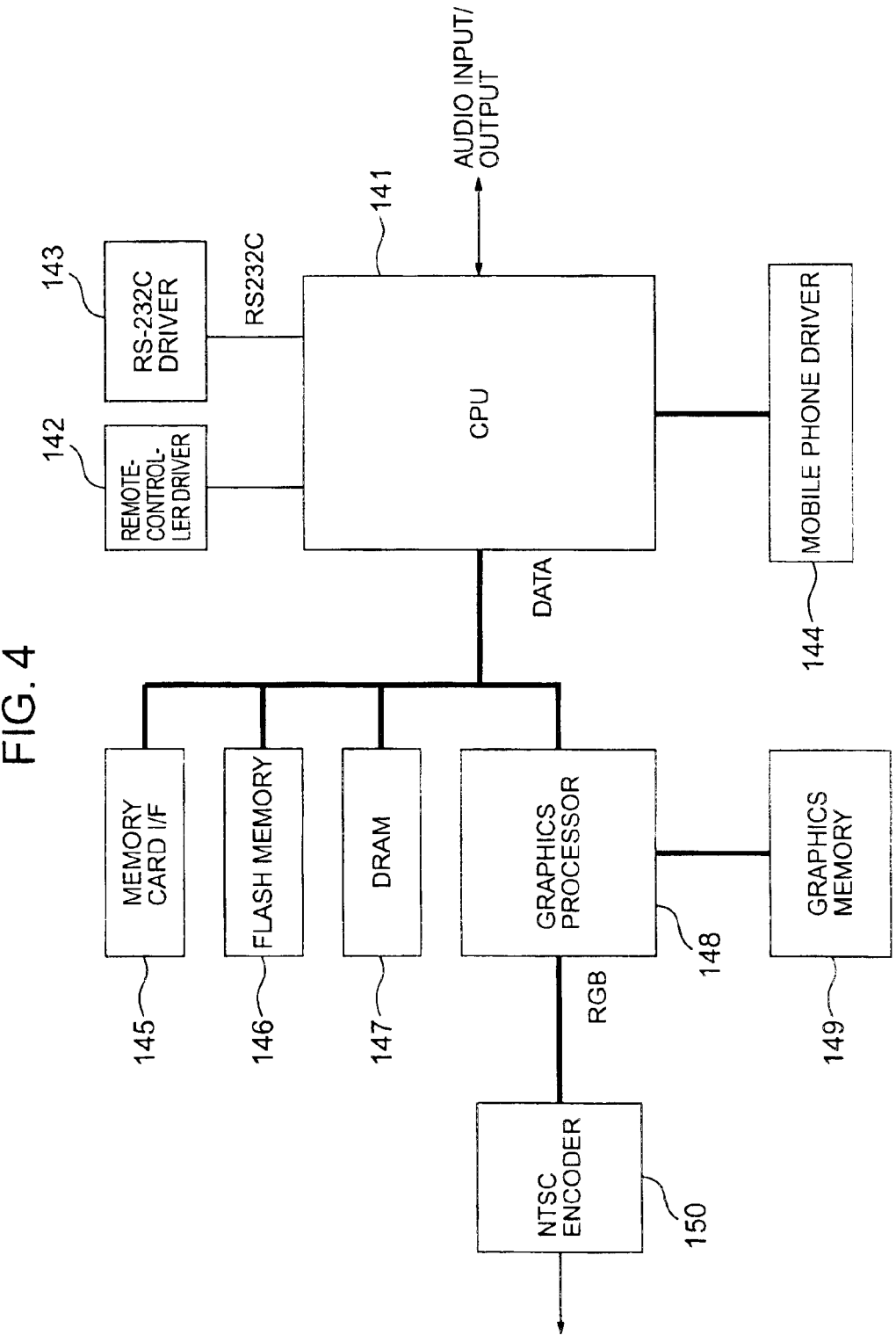
FIG. 4 is a hard configuration diagram of the navi-terminal device.

FIG. 4 is a diagram for illustrating one example of the hard configuration of the navi-terminal device. In the present example, the configuration includes a CPU 141, a remote-controller driver 142 for interpreting a signal from the above-described remote controller 135, an RS-232C driver 143, a mobile phone driver 144, an interface 145 with the memory card slot, a flash memory 146, a DRAM 147, a graphics processor 148, a graphics memory 149, and an NTSC encoder 150. An audio input/output is used for a microphone input for voice recognition and a voice-guide output.

The configuration explained so far is the configuration of the case where the data reception/transmission with the navi-information providing device 107 is performed using the communications network. As described earlier, however, as the configuration of the case where the broadcasting media are employed, there is need of an interface with an antenna for receiving the broadcasting, the decoder, and the like. Also, although the NTSC encoder is generally used for a signal transmitted to the display device, in an area where the PAL scheme is used in the broadcasting, or in the case where the display device is the PAL scheme-compliant device, the portion 150 is, of course, made compliant with the PAL scheme.

Figure 5:
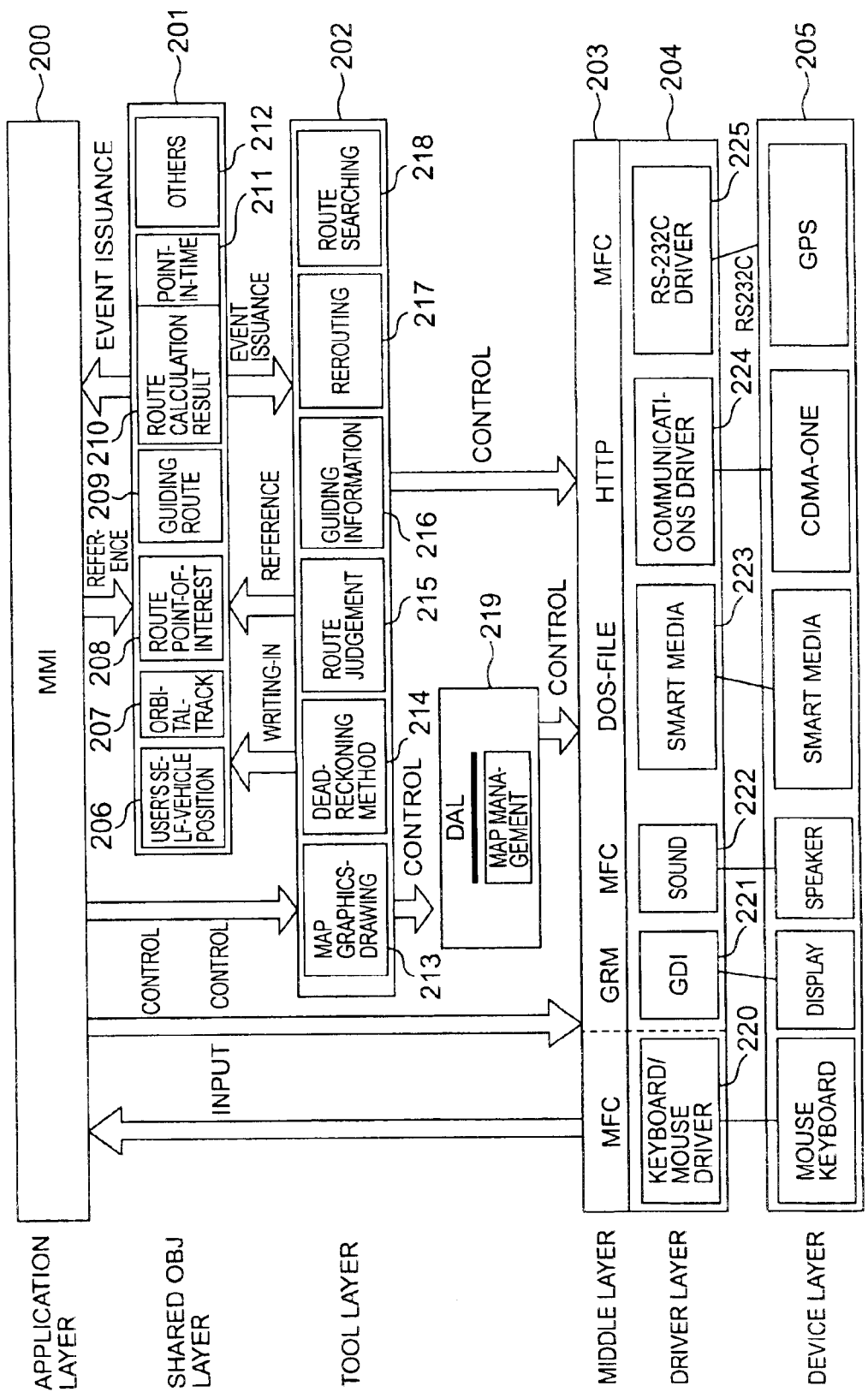
FIG. 5 is a software configuration diagram of the navi-terminal device.

FIG. 5 is a diagram for illustrating one example of the software configuration of the navi-terminal device. This configuration includes a device layer 205, a driver layer 204, a middle layer 203, a tool layer 202, a shared OBJ layer 201, and an application layer 200. Taking one example from among them, the device layer 205 indicates the hardware devices, which include external input devices such as a mouse and a keyboard, output devices such as the display and a speaker, a smart medium having a PCMCIA interface or the memory card, the mobile phone or the communications modem, and the GPS satellites that fetch the data via an RS-232C interface.

The driver layer 204 includes software programs that each drive the devices included in the above-described device layer 205. The middle layer 203 includes general common-software programs for driving the respective devices. The tool layer 202 includes therein tools that are absolutely essential for the navigation, e.g., a map graphics-drawing 213, a dead-reckoning method 214, a route judgement 215, a guiding information 216, a rerouting 217, a route searching 218, a map management 219, and the like. The shared OBJ layer 201 includes data that are necessary for the navigation and that can be accessed in common from the above-described tools included in the tool layer 202, e.g., a user's self-vehicle position 206, an orbital-track 207, a route point-of-interest 208, a guiding route 209, a route calculation result 210, a point-in-time 211, and the other information. These data issue an event, e.g., the display or the modification of each data, toward an MMI (i.e., Man Machine Interface) in the application layer 200. Otherwise, in correspondence with an event inputted from the mouse and the keyboard, data needed for and related with the event within the shared OBJ layer 201 is referred to via the MMI.

Next, the explanation will be given below concerning the services carried out in the present invention. Of them, the description will be first given regarding the case where, using the communications-type navigation system in FIG. 1, the user drives the user vehicle 102 while downloading the map. At first, the case is assumed where the following situation happens: During the driving, the navigation system installed in the user vehicle 102 stores, into the navigation system, map data in proximity to an area where the user vehicle is in an on-run state at present, and then the vehicle deviates from the stored map area. At this time, the navigation system in the user vehicle, using the mobile phone or the modem, issues a map data downloading request to the navi-information providing device 107 via the mobile-unit communications network 103, the provider 104, and the IP network 106. Here, in addition to the request issuing data, the navigation system transmits at least, e.g., data for describing the latitude/longitude of the vehicle's position and an IP address for indicating the position of the navi-information providing device 107 on the IP network 106. The position-identifying service, i.e., the vehicle-mounted GPS system or PHS, acquires the latitude/longitude data on the vehicle. This data is transmitted to the provider 104 via the mobile-unit communications network 103. The provider recognizes, from the received data, the above-described IP address of the navi-information providing device 107 specified by the vehicle-mounted navigation system, thereby accessing the navi-information providing device 107 via the IP network 106. From the latitude/longitude information requested from the vehicle, the navi-information providing device 107, based on the map data stored therein, creates necessary map data in a configuration determined in advance (e.g., a rectangle or a circle). This map data is transmitted to the broadcasting service provider 105, then being encoded and packetized. After that, the map data is transmitted to the satellites 101 and then, after being received at the vehicle 102, the map data is decoded at the vehicle so as to display the map.

In the above-described embodiment, the map data is downloaded onto the vehicle via the satellites with the use of the broadcasting. Meanwhile, in the next embodiment, the description will be given regarding a method of acquiring the necessary map data with the use of the communications alone. When the vehicle moves and thereby enters an area whose map data has been not stored in a storage device of the navigation device in the vehicle 102, as is the case with the previous example, the vehicle transmits the latitude/longitude information on the vehicle and the IP address of the navi-information providing device to the mobile-unit communications network 103, thereby transmitting the above-described data to the navi-information providing device 107 via the provider 104 and the IP network 106. As is the case with the example described at the left, the navi-information providing device 107 creates the necessary map data. Next, the IP address information on the navigation device in the vehicle is added to the created data, After that, the data is divided into packets, then being transmitted to the navigation device in the vehicle via the IP network 106, the provider 104, and the mobile-unit communications network 103.

In the above-described embodiments, the broadcasting signal-transferring path and the communications signal-transferring path that are independent of each other have been assumed as the data transmitting routes from the navi-information providing device 107. It is also possible, however, to perform a switching between the broadcasting and the communications, depending on the situation of the area where the vehicle is positioned at present, e.g., an area where the communications are possible although the broadcasting breaks off, or an area where the opposite is the case. When performing the switching, the display picture of the navigation device displays a necessary expense in the case of downloading the map data via the broadcasting and a necessary expense in the case of downloading the map data via the communications. Seeing the values makes it possible for the vehicle's driver to decide whether or not to execute the downloading when the map data is being lost. Of course, performing the setting in advance allows the execution of a full-automatic downloading of the map data.

Concerning the switching between the broadcasting and the communications, a broadcasting station and the broadcasting service provider have beforehand published a usual broadcasting-capable area and a communications-capable area. Thus, the data on the areas are accumulated on the navi-information providing device-side, and if a map downloading request occurs, the data are referred to. This makes it possible to perform the switching between the broadcasting and the communications. Incidentally, although the satellite broadcasting has been employed as the broadcasting transferring path, the employment of the other media, e.g., the ground-wave digital broadcasting, the FM broadcasting, and the like, results in no problem.

As the next service, the explanation will be given below regarding the service of delivering the point-of-interest (POI, i.e., Point of Interest) information to the user. The position-identifying system by the above-described GPS or PHS mounted on the vehicle 102 acquires and transmits the latitude/longitude information to the navi-information providing device 107 via the mobile-unit communications network 103, the provider 104, and the IP network 106. Based on the simultaneously transmitted user information, the navi-information providing device 107 causes the CGI 115 to perform the user authentication. Moreover, based on the latitude/longitude information, the device 107 returns, back to the user, a plurality of the POIs corresponding to the periphery of the latitude/longitude. As the transferring path here, either of the above-described broadcasting and communications may be employed. Also, when performing the service of downloading the map data in the above-described embodiment, the POIs are delivered simultaneously with the map data to be downloaded. This method makes it possible to deliver the map data to be displayed to the user terminal-side simultaneously with the POI data.

As the next service, the explanation will be given below regarding the registered point-of-interest service. The registered point-of-interest service is as follows: In accordance with a request from the user, an access is made from the vehicle 102 to the registered point-of-interest navi-server in the navi-information providing device 107 via the mobile-unit communications network 103, the provider 104, and the IP network 106, thereby deriving registered point-of-interest information that the user wishes. Otherwise, before the user goes for a drive, from the personal computer 110 (hereinafter, abbreviated as the PC) existing at each user's home 109, the user makes an access to the registered point-of-interest navi-server in the navi-information providing device 107 via the fixed-telephone network 108, the provider 104, and the IP network 106. This access allows the registration/deletion of the point-of-interest information that the user wishes, thereby making it possible to organize the registered data so that the user need not perform a redundant operation at the time of the actual driving.

The user management navi-server performs the user registration and the modification of the registered contents. The route along which a request is transferred from the user is the same as that of the above-described registered point-of-interest service. Here, the following services are made available: Registering a new user, deleting the registration, modifying and confirming the registered contents, retrieving and confirming charge-billing information such as a usage fee, and the like.

The route searching service is the following service: At first, the user specifies a destination at the time of driving the vehicle. Next, from the information, i.e. the destination, the present position obtained from the position-identifying system such as the above-described GPS, and the user's taste described earlier, and the like, the service searches an optimum guiding route, then sending the result to the user.

FIG. 6 and FIG. 7 illustrate the picture transition at the time of performing a route guidance. A picture (1) is a display at the terminal-side at the time when the navi-server is now calculating the guiding route. The navi-server can perform the route searching under a condition of adding thereto traffic-congestion information and under-construction information. A picture (2) illustrates a picture example where the terminal displays the whole of the guiding route 3100 after the route searching has been finished. After the navi-server has transferred the searching result to the terminal, the terminal adjusts the displaying scale so that the entire guiding route ranging from the present place to the destination place will be displayed. Furthermore, with the picture and a voice, the terminal issues a caution of encouraging a driving that is compliant with the actual traffic regulations. A picture (3) is a picture for confirming the driver as to whether or not the route guidance may be started. If the driver gets ready, the driver pushes a "decision" button of the remote controller. A picture (4) is a one at the time when the "decision" button has been pushed down. After that, at a point-in-time when a driver's self-vehicle position 3104 has ridden on the guiding route 3100, there comes a picture (5). A picture (6) is a one at the time when the self-vehicle position has approached a guiding point. The guiding point is a point-of-interest where the guiding route turns aside from the leading road and thus the moving direction needs to be modified. The guiding point refers to, e.g., the case where the self-vehicle makes a right or left turn at an intersection point. When the self-vehicle position comes nearer to the guiding point, the half of the picture displays, with an arrow, the direction to which the self-vehicle should make the turn and the distance up to the point. Also, a voice makes a guidance such as "Please turn to the left direction 300 meters ahead from here." A picture (7) is a one at the time when the self-vehicle position comes closer to the destination place. The picture and a voice make an announcement of "You have arrived around the destination place. The guidance will be over." About 10 minutes thereafter, there comes a picture (8), which displays the present place on the map.

Figure 8:
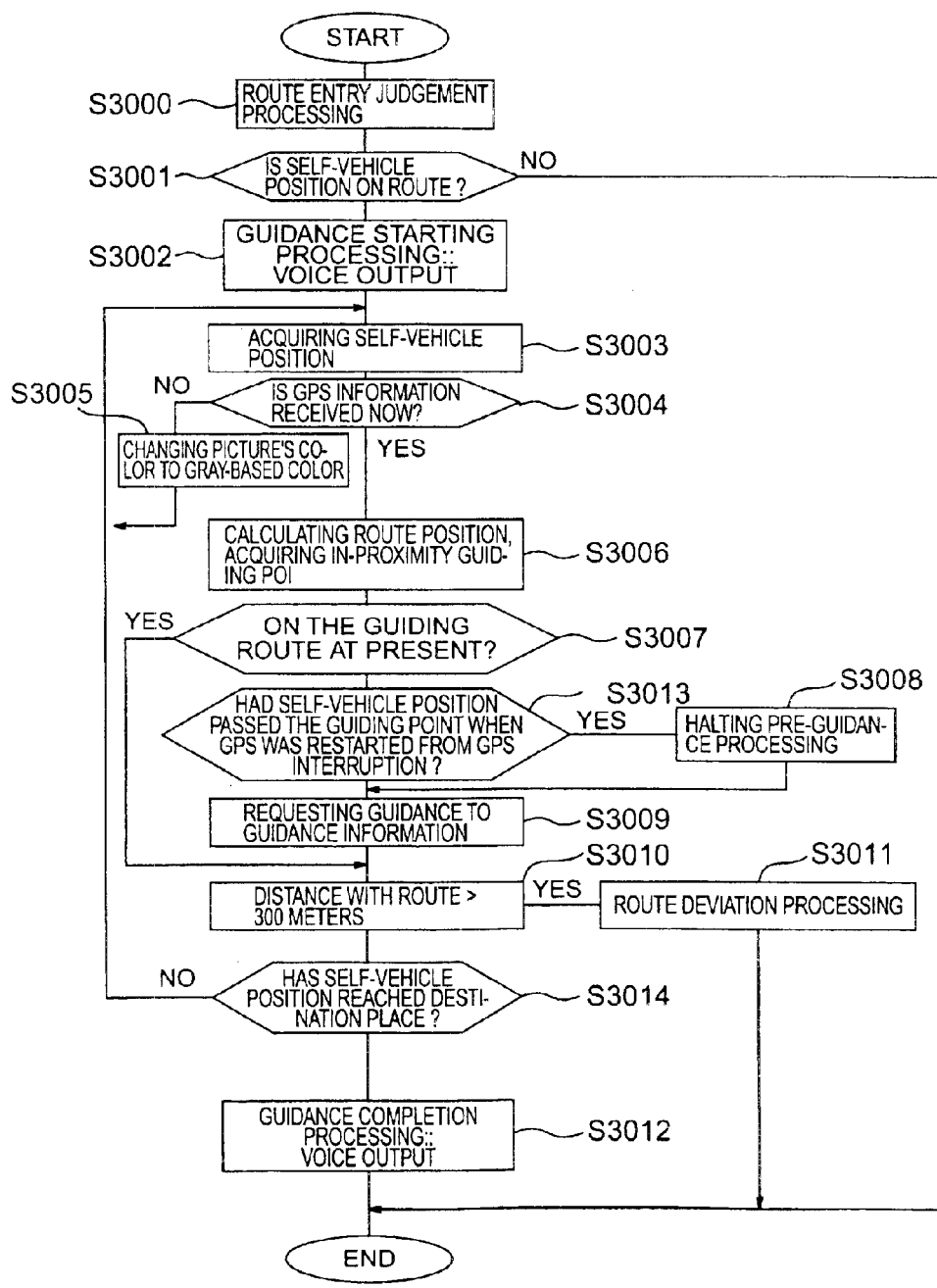
FIG. 8 is a processing flow diagram at the terminal for performing the route guidance processing.

FIG. 8 illustrates a processing flow at the terminal for performing the route guidance processing. At steps S3000 and S3001, a judgement processing is performed as to whether or not the self-vehicle position has entered the guiding route, and the next processing is awaited until the self-vehicle position has ridden on the guiding route. At a step S3002, there is performed the guidance of "The route guidance is started." indicated on the picture (5) in FIG. 6. At a step S3003, the utilization of the GPS acquires the information on the self-vehicle position. At steps S3004 and S3005, if the self-vehicle position comes into under a location such as a skybridge where the GPS information can not be obtained, the picture's color on display is made darker in order to inform the driver that the present state is a positioning-incapable state. At a step S3006, a distance between the self-vehicle position and the guiding route is calculated, thereby judging whether or not the self-vehicle position just rides on the guiding route and also has approached a guiding point. At a step S3007, even if the self-vehicle position comes closer to the guiding point, if the guiding point is a point to which the guidance of the self-vehicle has been already finished (i.e., a point at which an arrow is displayed like the point illustrated on the picture (6) in FIG. 7), the guidance to the point need not be given and accordingly nothing is done. Also, a step S3013 is of a processing of the case where, although the self-vehicle position has approached the guiding point and the arrow has been displayed, thereinafter, the reception state of the GPS becomes worse and thus the positioning becomes impossible. In that case, at a step S3008, displaying the arrow is halted. A step S3009 is of a processing where the self-vehicle position has normally approached the guiding point. At this step, if the self-vehicle position comes closer to the guiding point as far as 300 meters, an arrow is displayed like the picture (6) in FIG. 7, and the guidance with a voice is also given. Also, the distance between the self-vehicle position and the guiding route exceeds 300 meters, the self-vehicle position is assumed to deviate from the guiding route, and at steps S3010 and S3011, a route-guidance stopping processing is performed. This distance of 300 meters is no absolute numerical-value and thus, depending on the positioning accuracy, it is better to modify this distance. Namely, this distance is made shorter if the positioning error is small, and this distance is made longer if the positioning error is large. At a step S3014, a judgement is made as to whether or not the guidance to the destination place has been completed. If the self-vehicle position has reached the destination place, a step S3012 performs the display illustrated on the picture (7) in FIG. 7.

Figure 9:
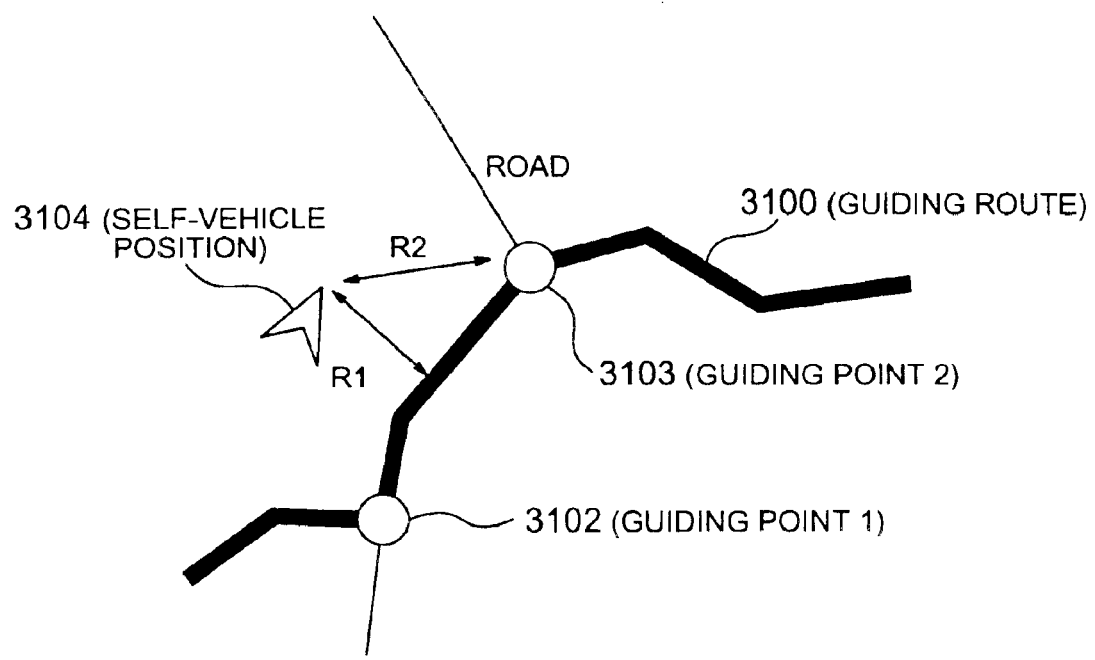
FIG. 9 is a conceptual diagram for explaining a distance calculation among a user's self-vehicle position, the route, and guiding points.

FIG. 9 illustrates the relationship among the self-vehicle position 3104, the guiding route 3100, and guiding points

3102 and 3103. There is a possibility that, depending on the positioning accuracy, the self-vehicle position 3104 may be measured at a location shifted from on the road. Thus, while always measuring the distance between the self-vehicle position and the guiding route, if the distance exceeds a certain fixed range, the self-vehicle position is judged to deviate from the guiding route. In this embodiment, the distance has been set to be 300 meters, which corresponds to R1. Also, a distance (R2) between the self-vehicle position and the guiding point is always measured. If the self-vehicle position comes nearer to this R2 by a certain fixed distance, the picture of the guidance information (i.e., an arrow like the picture (6) in FIG. 7) is displayed. This distance is modified, depending on the speed of the self-vehicle. Namely, in the case of a low-speed driving, the information may be displayed directly in front of the guiding point (e.g., 100 to 300 meters). In the case of a high-speed driving, however, the driving route can not be modified if the information is displayed directly in front of the guiding point. Consequently, in the case of the high-speed driving, the information is displayed in the state of a remote distance (e.g., 500 meters to 1 kilometer).

Figure 10:
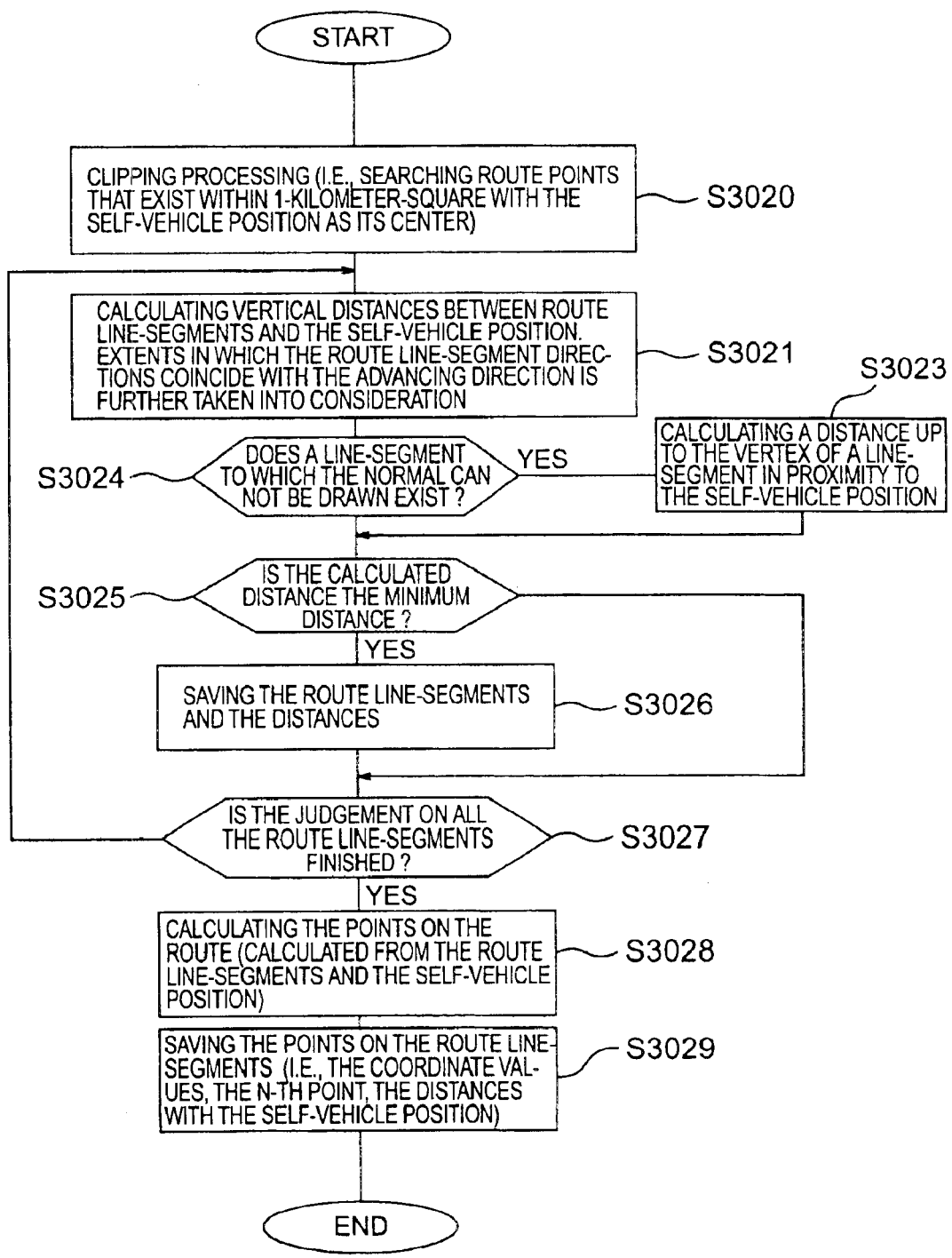
FIG. 10 is a flow chart for measuring a distance between the user's self-vehicle position and the route.

FIG. 10 is a flow chart for measuring the distance between the self-vehicle position and the guiding route. At a step S3020, there is performed a processing of selecting only the route line-segments of the portions in proximity to the self-vehicle position. Instead of checking the route in the driving sequence, a route in proximity to the self-vehicle position is selected each time in this way. This method makes it possible to restart the route guidance even after the positioning-incapable state has long lasted, or even at the time of restoring back onto the route after having deviated from the route. At a step S3021, when calculating the distance between the self-vehicle position and the guiding route, there is performed a distance calculation where the advancing direction of the self-vehicle is taken into consideration. Namely, a route portion where the route direction is the same as the advancing direction is selected with a higher-priority. In this way, the distances with the line-segments selected at the step S3020 are all calculated, then judging that the self-vehicle position lies on a line-segment existing at the nearest distance (S3025 to S3027).

Figure 11:
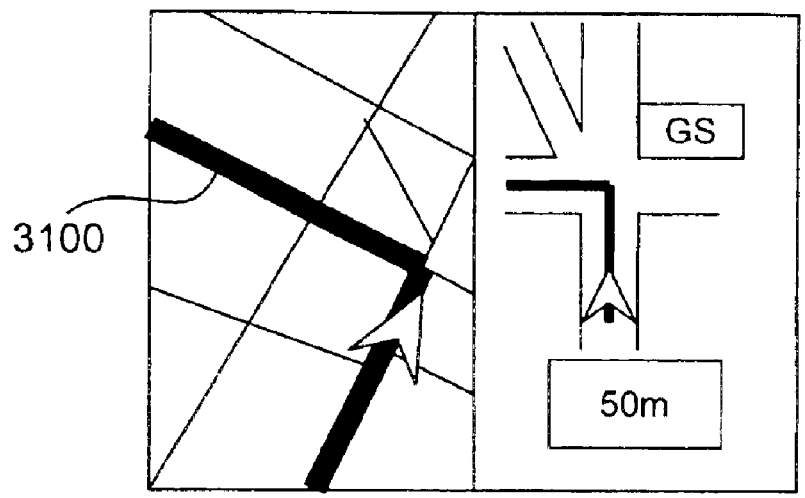
FIG. 11 is a diagram for illustrating an example of an intersection point enlarged-view at a guiding point.
Figure 12:
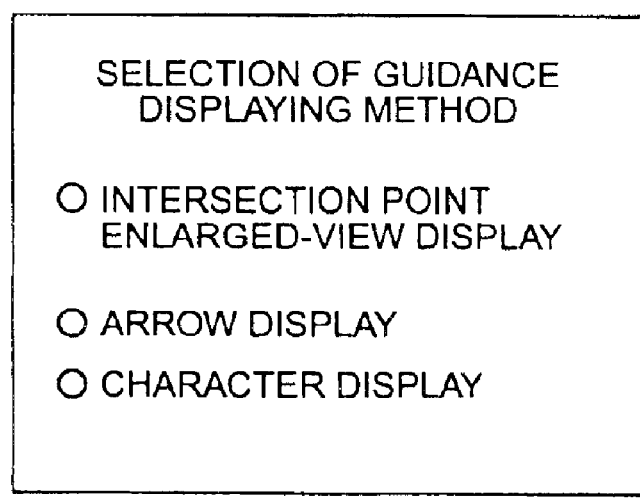
FIG. 12 is a diagram for illustrating an example of the menu picture for specifying a method of displaying the guiding point.

At the time of giving the guidance instruction when the self-vehicle position comes nearer to a guiding point, an enlarged-view of the intersection point may be displayed instead of the arrow display. FIG. 11 illustrates a display example of an intersection point enlarged-view at a guiding point. Whether the display of a guiding point should be given by using the arrow or the intersection point enlarged-view can be set in advance by a menu illustrated in FIG. 12. Either the terminal or the navi-server may store this setting. If the navi-server store this setting, in some cases, it becomes unnecessary to transmit unnecessary guidance data to the terminal. This results in an effect of reducing the communications amount. If, for example, the intersection point enlarged-display is unnecessary, it becomes unnecessary to transmit the detailed map and the intersection point information from the navi-server. Also, there also exists a scheme of dynamically modifying the displaying methods on the halfway to the route. For example, if the intersection point is simple enough like a T-character street or an orthogonal crossroad, the arrow may be displayed. Meanwhile, if the intersection point is of a complicated configuration like the one in FIG. 11, the enlarged intersection point may be displayed. As still another method, there exists a method where, depending on the road type, the following differentiated-type display is performed: The arrow is displayed in the case of a simple road like an expressway's branch, and the intersection point enlarged-view is displayed in the case of an ordinary road.

Also, if no detailed map exists in the terminal, the terminal can not display the intersection point enlarged-view. Thus, it is possible for the navi-server to create the intersection point enlarged-view and to transfer the enlarged-view to the terminal. For example, if the detailed map of the halfway to the route exists in the terminal, the terminal creates the intersection point enlarged-view. If the terminal is entering a location whose detailed map the terminal does not have, the terminal requests the navi-server to create the detailed map, and has the navi-server send the result to the terminal. As another method, there also exists a method where, after the navi-server has transferred the detailed map to the terminal, the terminal creates the intersection point enlarged-view. Meanwhile, when wishing to reduce the communications amount with the navi-server, there also exists a method where the arrow display is performed with respect to only a guiding point at which the terminal can not create the intersection point enlarged-view.

Also, even when the detailed map exists in the terminal, if the detailed map is old and does not reflect on the present situation, a false intersection point is displayed. Accordingly, it is better not to perform the creation of the intersection point enlarged-view at the terminal. In this case as well, the navi-server creates the intersection point enlarged-view, or the terminal creates the intersection point enlarged-view after the navi-server has transferred the detailed map to the terminal. A judgement as to whether or not the detailed map in the terminal has become old is performed by making a comparison between the version number of the map in the terminal and that of the map in the navi-server.

Figure 13:
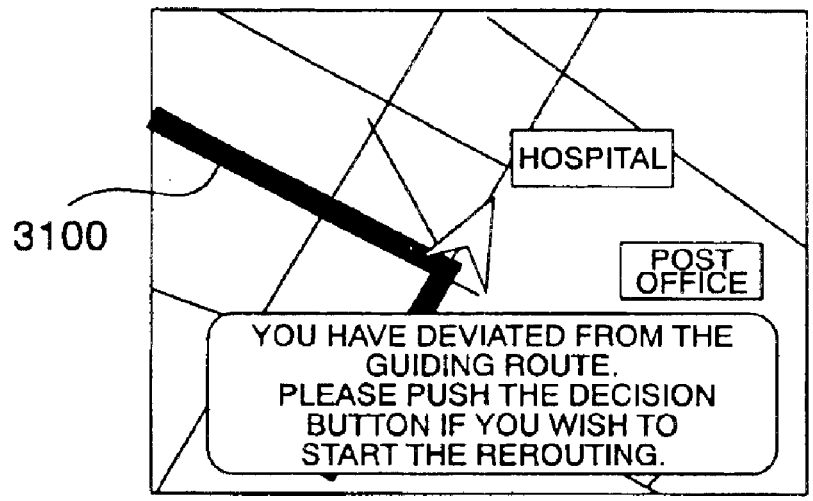
FIG. 13 is a diagram for illustrating an example of the picture display at the time of the route deviation.

FIG. 13 is a diagram for illustrating a picture display example at the time of the guiding-route deviation. This example is a one where, when the terminal-side map does not satisfy the requirements for the route searching, the rerouting is performed at the navi-server. Since there is need of performing the data communications, a picture for the confirmation is presented to the driver, and a voice asks the driver to give the confirmation. If the driver pushes a decision button, the navi-server starts the rerouting. Moreover, if the driver does nothing in 10 seconds or more, or pushes a cancel button, the guidance is finished. Otherwise, instead of finishing the guidance, there also exists a method where, as illustrated in FIG. 14, the guidance is interrupted while the self-vehicle position is deviating from the guiding route.

Figure 14:
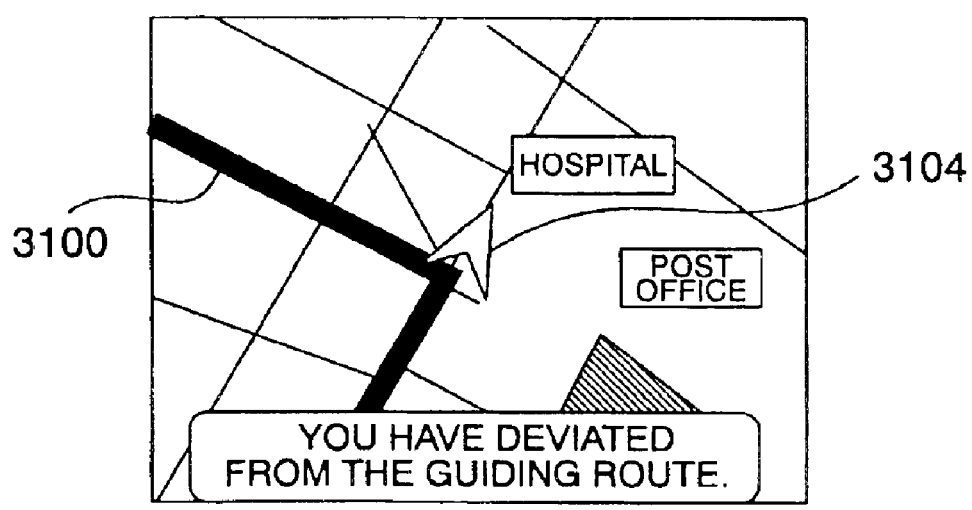
FIG. 14 is a diagram for illustrating a display example in the case where no reroute processing is performed when deviating from the route.

FIG. 14 is a diagram for illustrating a display example in the case where no reroute processing is performed when the self-vehicle position deviates from the guiding route. A voice also makes a guidance of "You have deviated from the guiding route." After that, at a point-in-time when the self-vehicle position 3104 rides on the guiding route, the route guidance is restarted.

Also, if the terminal-side map is the route-searching-capable data, the reroute processing can also be performed at the terminal. In this case, the terminal performs the rerouting within a range of the detailed map that exists therein. If the terminal is entering the location whose detailed map does not exist therein, the terminal performs the rerouting after the terminal has had the detailed map transferred from the navi-server.

Figure 15:
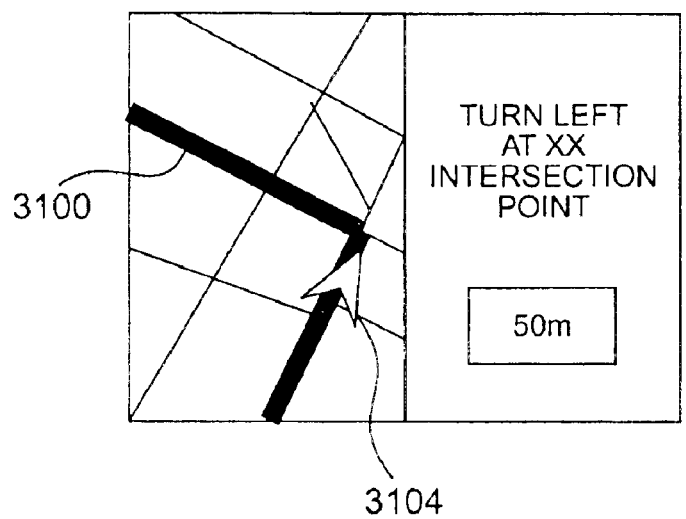
FIG. 15 is a diagram for illustrating a display example of the guidance by characters.
Figure 16:
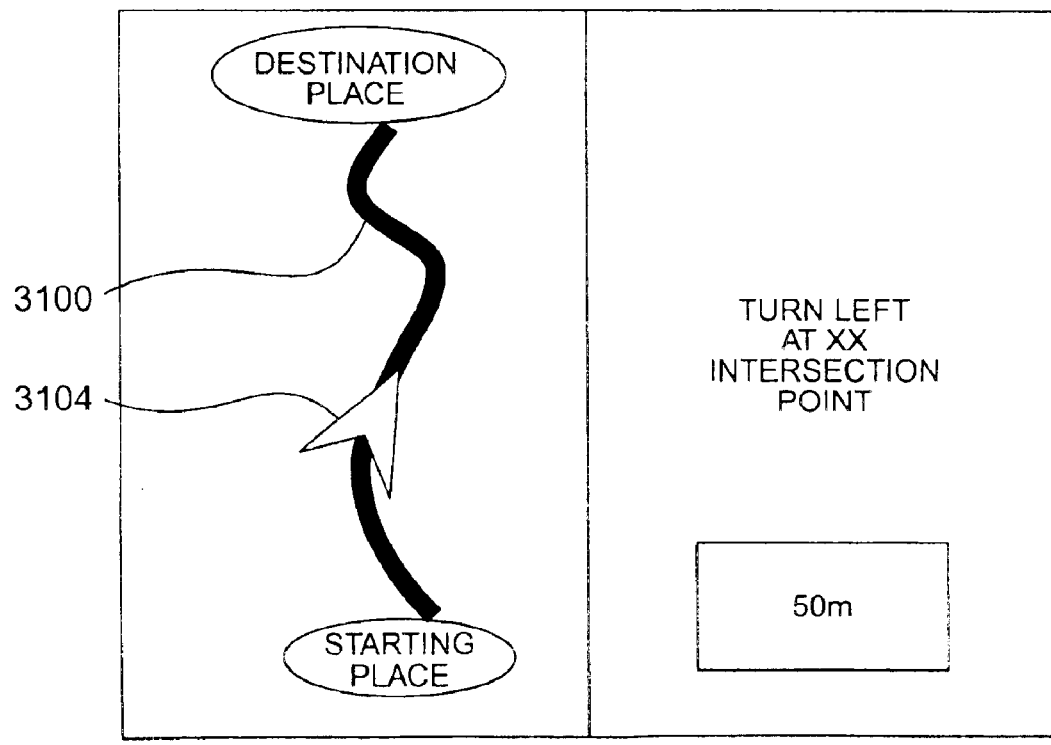
FIG. 16 is a diagram for illustrating a display example in a state where the guidance is being performed using a schematic map and the route data.

FIG. 15 illustrates a display example of the route guidance by characters. When the self-vehicle position 3104 approaches a guiding point, the characters are displayed to show the direction and the distance in and at which the self-vehicle position should advance. Also, since the driver can not stare at the characters, the guidance by a voice is performed simultaneously. The guidance by the character information like this can be performed even if no detailed map exists in the terminal. FIG. 16 illustrates a display example in a state where the guidance is being performed using a schematic map and the guiding route data. The left-half of the picture displays the guiding route, and the right-half thereof displays the guidance by the character information. A voice also makes a guidance of the guiding information. Since the route-displaying part is of no detailed map, it can not display the intersection point configuration or the like. The route-displaying part, however, makes it possible to confirm whether or not the self-vehicle position 3104 just rides on the guiding route 3100. This scheme allows the guidance to be implemented only if the schematic map exists in the terminal, thereby making it unnecessary to deliver the detailed map.

Figure 17:
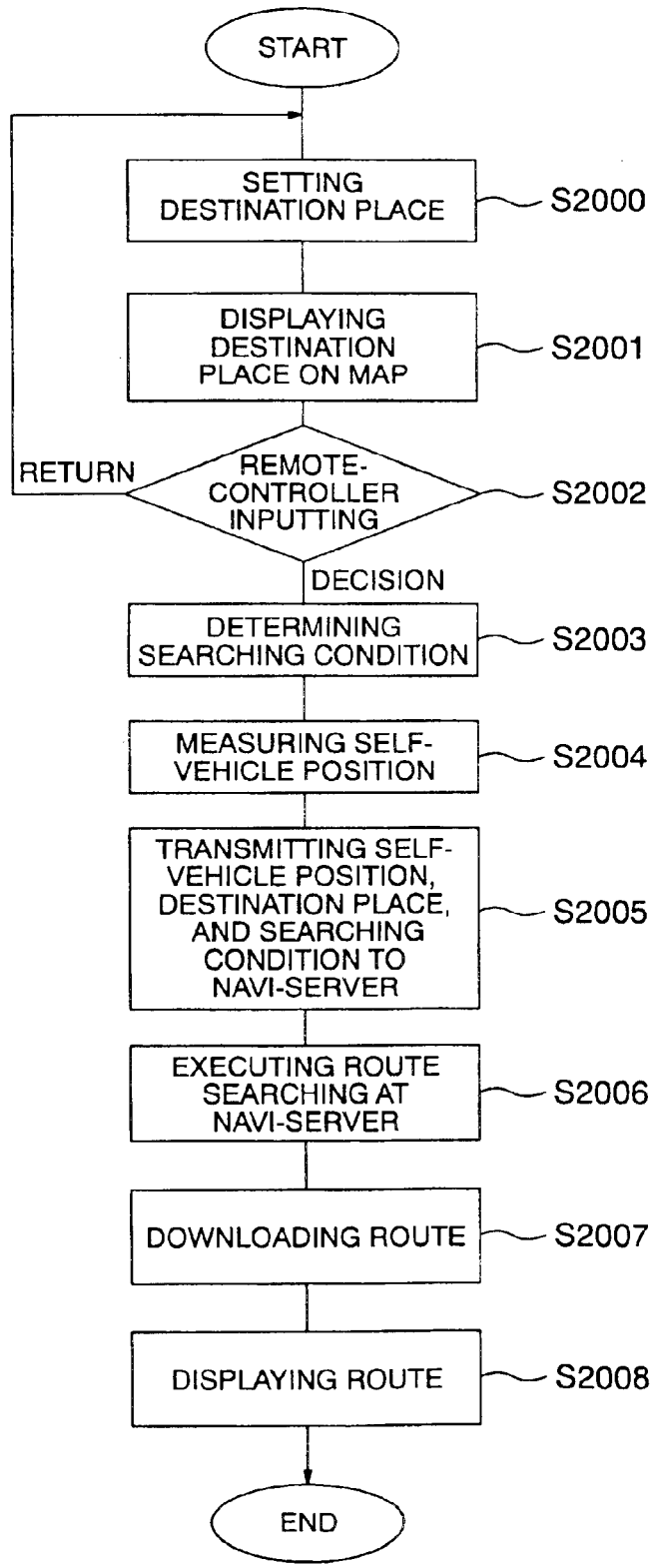
FIG. 17 is a flow diagram for the route searching.
Figure 18:
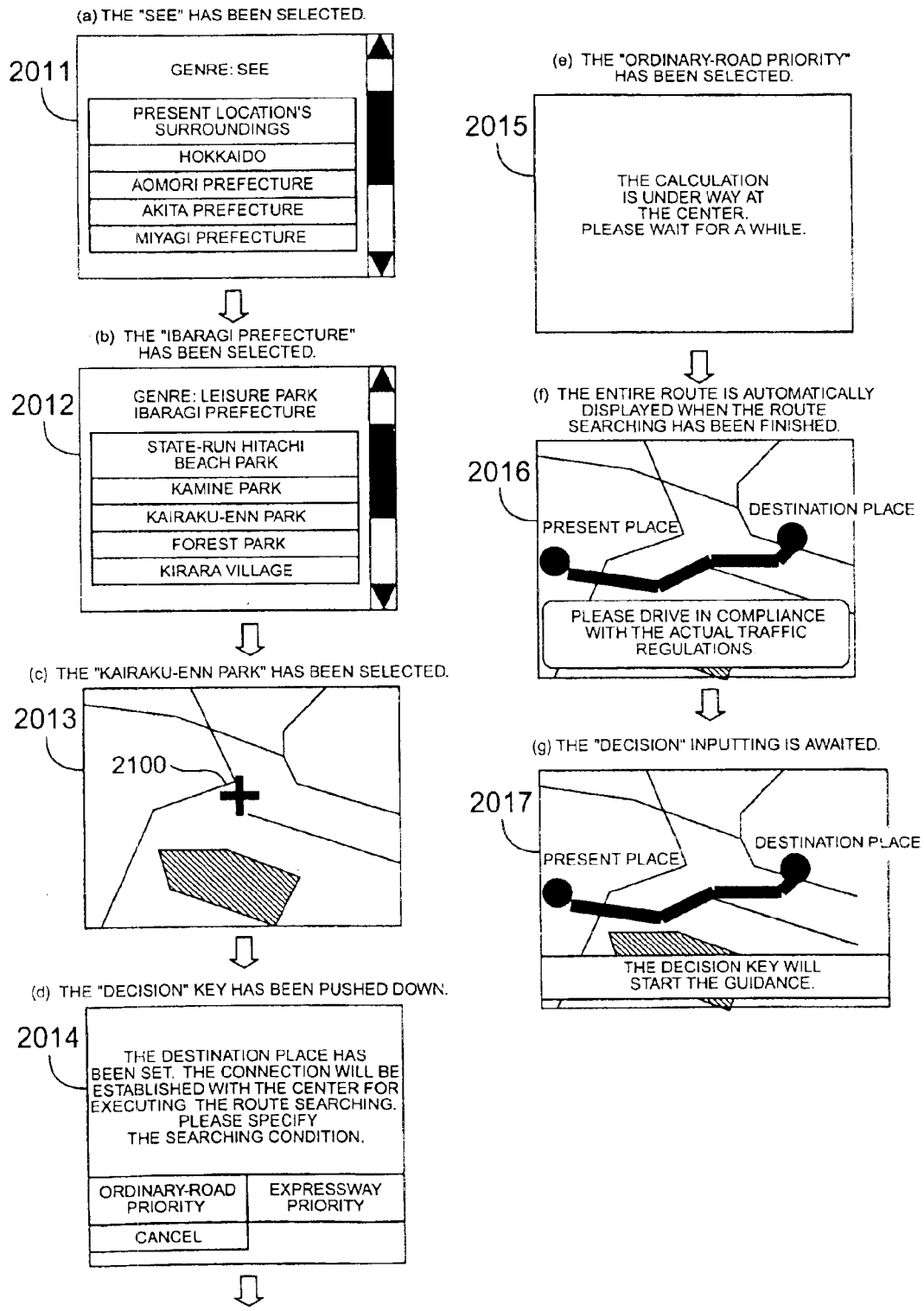
FIG. 18 is a diagram for illustrating picture transition diagrams for setting a destination place.

FIG. 17 illustrates a flow diagram for the guiding-route searching. FIG. 17 describes the operations of the navi-terminal and those of the navi-server in a summarized manner. At first, at a step S2000, the navi-terminal sets a destination place. Concerning the setting of the destination place, there exists a method where, for example, an area list or a category list is downloaded from the navi-server so as to focus the destination place with the use of the list. The above-described list is written in such a language as HTML (i.e., Hyper Text Markup Language). The hyperlink to the CGI (i.e., Common Gate Interface) in the navi-server has been set up to the respective items in the list. Consequently, the mere selection of an item permits the user to download the list from the navi-server. The repetition of the processing like this with the use of the HTML makes it possible for the user to ultimately focus the location set as the destination place. FIGS. 18(*a*) and (*b*) illustrate its picture examples. The pictures in FIG. 18 are displayed by an Internet browser (not illustrated) set up at the navi-terminal side.

In FIG. 18, (a) illustrates a picture for specifying state or Prefecture after the genre of the destination place has been specified. Specifying "Ibaragi Prefecture" out of (a) causes the picture in (b) to appear. Also, selecting "the present location's surroundings" causes the self-vehicle position to be measured and transmitted to the navi-server, thereby making it possible to obtain the name list as is illustrated in (b). This selection will be described later, but here, the case of having selected state or Prefecture will be focused and described.

In FIG. 18, (b) illustrates an example where leisure parks in Ibaragi Prefecture have been focused. If the user selects a name out of the picture in (b), point-of-interest information on the name is transmitted from the navi-server. There exist at least 2 types of available point-of-interest information transmitting methods. One is a method of making the point-of-interest information flow in data streams, and the other is a method of saving the point-of-interest information into a file so as to transmit the file name in a manner of being included in the HTML. The transmitting formats will be illustrated in FIG. 19 and FIG. 20.

Also, a method may be used where the navi-terminal side displays the map and specifies, on the map, the point-of-interest which is to become the destination place.

After having focused the location of the destination place, then, at a step S2001, the location is displayed on the map. In FIG. 18, (c) illustrates the display of the point-of-interest onto the map. FIG. 18(*c*) displays on the map a cross 2010, which is the point-of-interest focused by the above-described processing.

The user confirms the above-described point-of-interest on the map, and if the user wishes to select the point-of-interest as the destination place, the user pushes the "decision" button of the remote controller. The navi-terminal confirms it at a step S2002 and after that, the navi-terminal transitions to a processing at a step S2003. If the user pushes a "return" button of the remote controller, the navi-terminal sets the destination place once again.

Once the destination place has been set, at the step S2003, a searching condition is set. Regarding the searching condition, there exists a method where, for example, several searching conditions are displayed on the picture so as to request the user to select a searching condition from among them. In FIG. 18, (d) illustrates this display example. FIG. 18(*d*) displays 2 types of searching conditions, i.e., a general-road priority and an expressway priority, and the user can select either of them. Incidentally, in addition to these conditions, a charge priority, a time priority, a distance priority, or the like may be set as the route searching conditions. Otherwise, a combination of a plurality of conditions from among them may be specified.

After the user has specified the route searching condition, at a step S2004, the navi-terminal measures the self-vehicle position. The appliance referred to as the GPS (i.e., Global Positioning System) is utilized for the measurement of the self-vehicle position. The GPS is generally used in the existing car navigation system.

When the measurement of the self-vehicle position has been finished, at a step S2005, the navi-terminal transmits, to the navi-server, the self-vehicle position together with the destination place and the route searching condition set so far. As the transmitting protocol to the navi-server, for example, HTTP (i.e., Hyper Text Transfer Protocol) can be used. Also, as the transmitting format of the destination place, the searching condition, and the self-vehicle position, a method can be used where the destination place, the searching condition, and the self-vehicle position are described in CGI parameters as a part of the URL (i.e., Uniform Resource Locator).

At a step S2006, based on the destination place, the searching condition, and the self-vehicle position transmitted from the navi-terminal, the navi-server carries out the route searching, then transmitting the calculation result to the navi-terminal. In the meantime, on the picture at the navi-terminal, there is displayed a notice to the effect that the route calculation is under way at the navi-server. FIG. 18(*e*) illustrates this notice. This notice, however, is not essential.

At a step S2007, the navi-terminal receives the above-described calculation result. The route searching result includes the latitude/longitude of a pass point and the guiding point information. Here, transmitting the latitude/longitude of the pass point just as they are can be considered to result in an increase in the communications amount. Consequently, a reference point data and differential data from the reference point may also be transmitted. This will be described later. Also, when transmitting the route data to the navi-terminal, the HTTP may also be used. As the transmitting methods in that case, at least 2 types of transmitting methods are available. One is a method of making the route data flow directly into the HTTP. In this method, after transmitting the contents type, the route data is transmitted in streams. The other is a method of saving the route data into a file so as to transmit the file name in a manner of being described in the HTML. In the present embodiment, the format of the latter case will be illustrated in FIG. 21, FIG. 22, FIG. 23, and FIGS. 24A and 24B. The details thereof will be described later.

At a step S2008, the navi-terminal receives the route data from the navi-server, and displays the route data on the map. FIG. 18(f) illustrates this picture example. The picture in FIG. 18(f) displays a map with the smallest scale that allows the entire route to be displayed. If there exists no such map, the display is performed using the smallest scale map available. The route data is displayed along the road and in a color differing from that of the map. Also, simultaneously with the display of the route, there may also be performed a display for encouraging the user to drive in compliance with the actual traffic regulations. Also, the user may be informed of the display with a voice.

Furthermore, in a time of a few seconds, the picture in FIG. 18(g) appears. Here, there is displayed a notice to the effect that pushing the decision key of the remote controller starts the guidance. Also, the user may be informed of the notice with a voice. This has a meaning that the guidance is started after the user has read the notice items. The user's pushing the decision key starts the route guidance.

Here, the explanation will be given regarding the transmitting formats in FIG. 19 and FIG. 20. FIG. 19 illustrates an example of the HTML after the focusing of the category has been finished. This is the HTML for specifying state or Prefecture, and describes the picture in FIG. 18(a). Concerning state or Prefecture, only the hyperlink to the navi-server CGI has been set up thereto. Regarding "present location's surroundings", however, there is provided a menu for retrieving the present location's surroundings around the navi-terminal. Consequently, retrieving the present location's surroundings can not be executed until the navi-terminal transmits the self-vehicle position to the navi-server.

Figure 25:
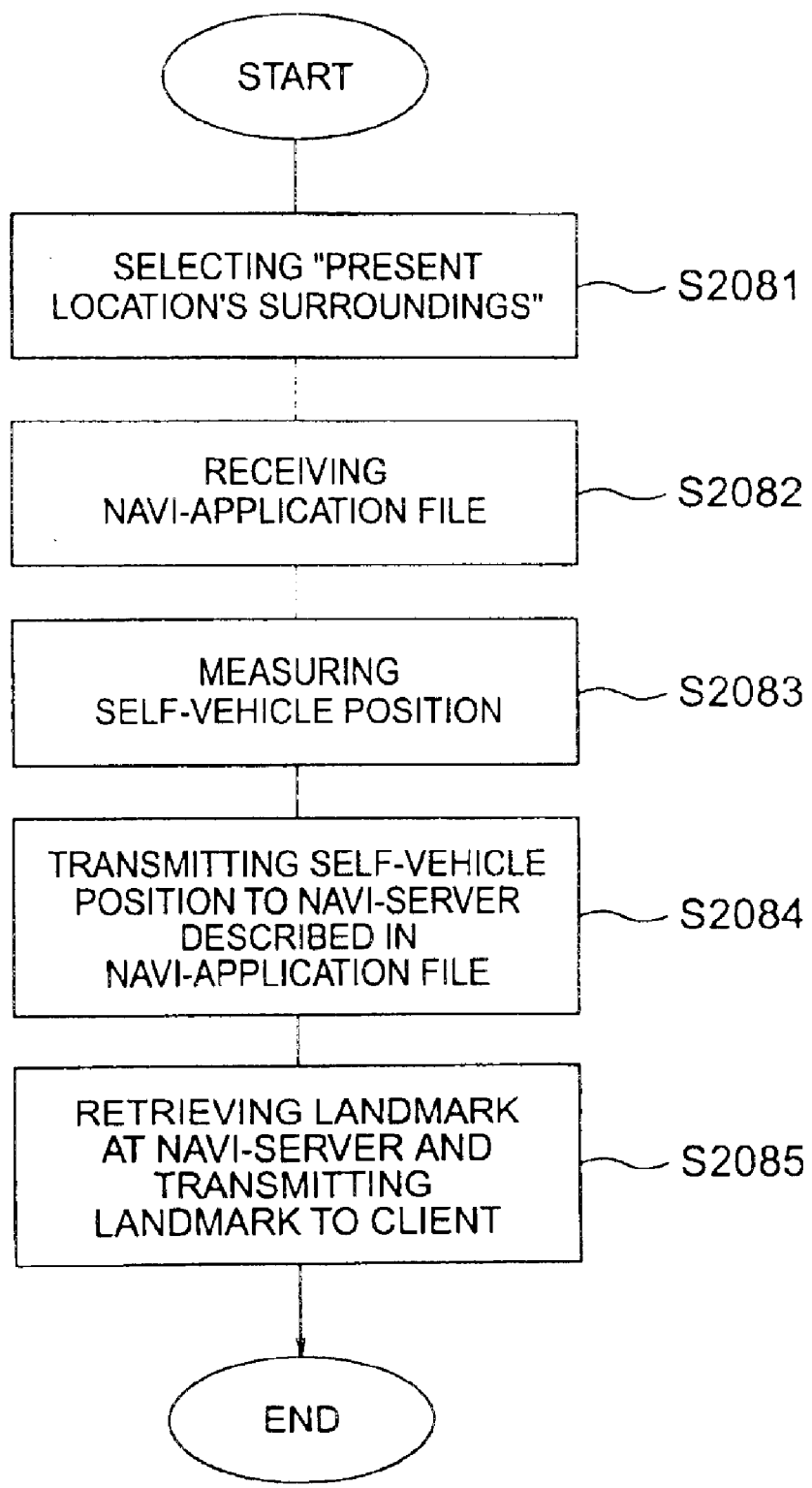
FIG. 25 is a flow chart for retrieving point-of-interest information on the periphery of the present location.

Next, referring to FIG. 25, the explanation will be given below concerning the case where the user has selected "the present location's surroundings" in FIG. 18(a). In this case, the navi-server transmits a navi-application file in FIG. 19(b). The navi-server creates this navi-application file simultaneously with the creation of a state or Prefecture list in FIG. 19(a). The hyperlink has been set up to the navi-application file from "the present location's surroundings". As a result, if the user selects "the present location's surroundings" at a step S2081, the navi-terminal, at a step S2082, can download the navi-application file from the navi-server. If the navi-terminal downloads the navi-application file, the navi-terminal starts up an application for processing the file. The navi-application file has described commands for the navi-terminal-side application and a navi-server URL for requesting the next route searching processing. The above-described application that has read in this, at a step S2083, measures the self-vehicle position by the GPS or the like, then, at a step S2084, transmitting the self-vehicle position to the navi-server. Having received the self-vehicle position, the navi-server, at a step S2085, retrieves landmark information on the surroundings around the self-vehicle position so as to create the list in the HTML, then transmitting the list to the navi-terminal. Its format and its picture have been just illustrated in FIG. 20 and FIG. 18(b), respectively. The proceedings to be performed from the reception of the list in FIG. 18(b) are completely identical to the proceedings in the case of having selected state or Prefecture.

Through the above-described processings, the user can obtain the route guidance service. The user, however, does not necessarily drive the self-vehicle along the guiding route that the navi-server has calculated. If the self-vehicle deviates from the route, the rerouting (i.e., route re-calculation) is executable. This rerouting will be explained next.

Figure 27:
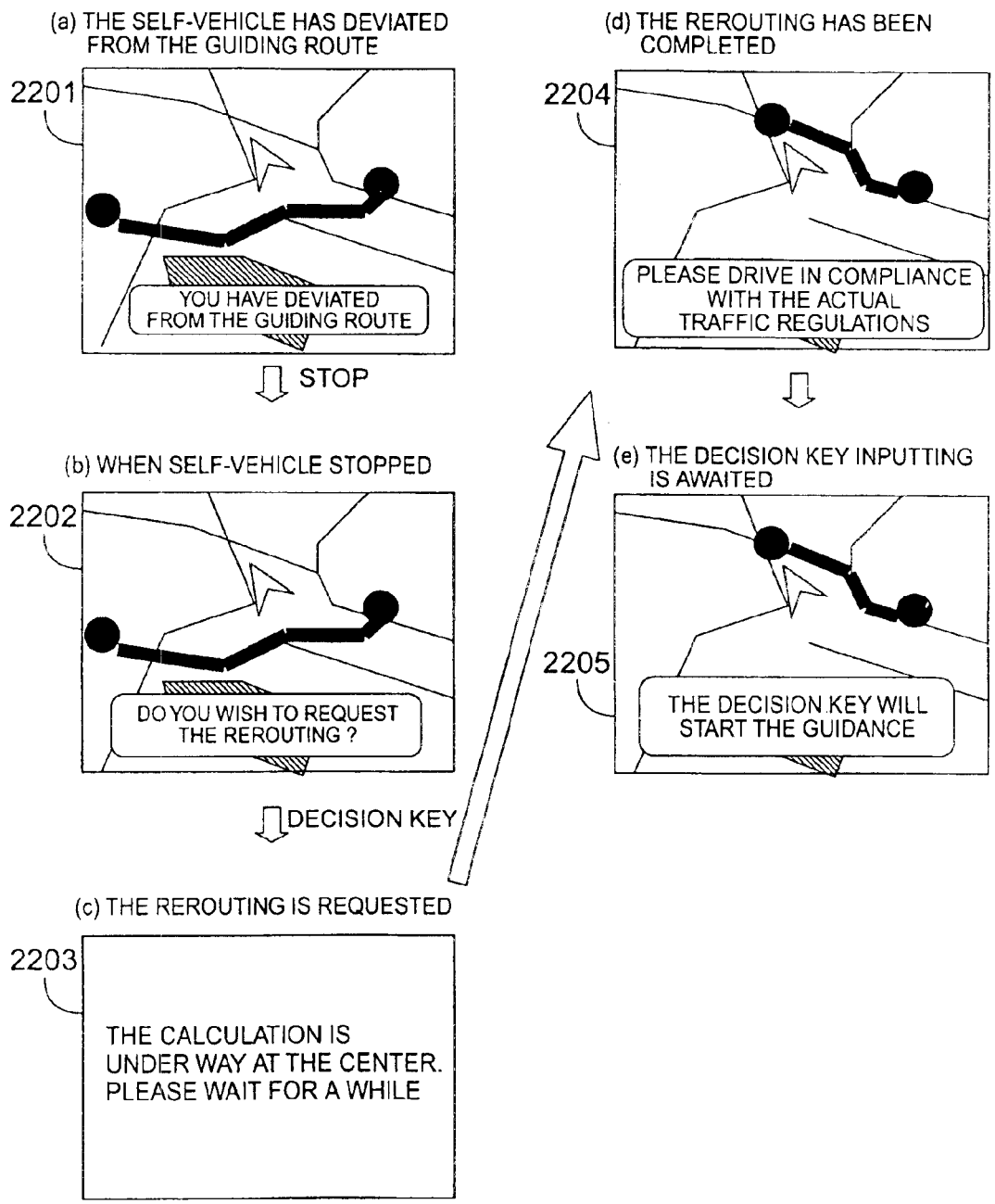
FIG. 27 is a diagram for illustrating the picture transition of the route re-searching.
Figure 28:
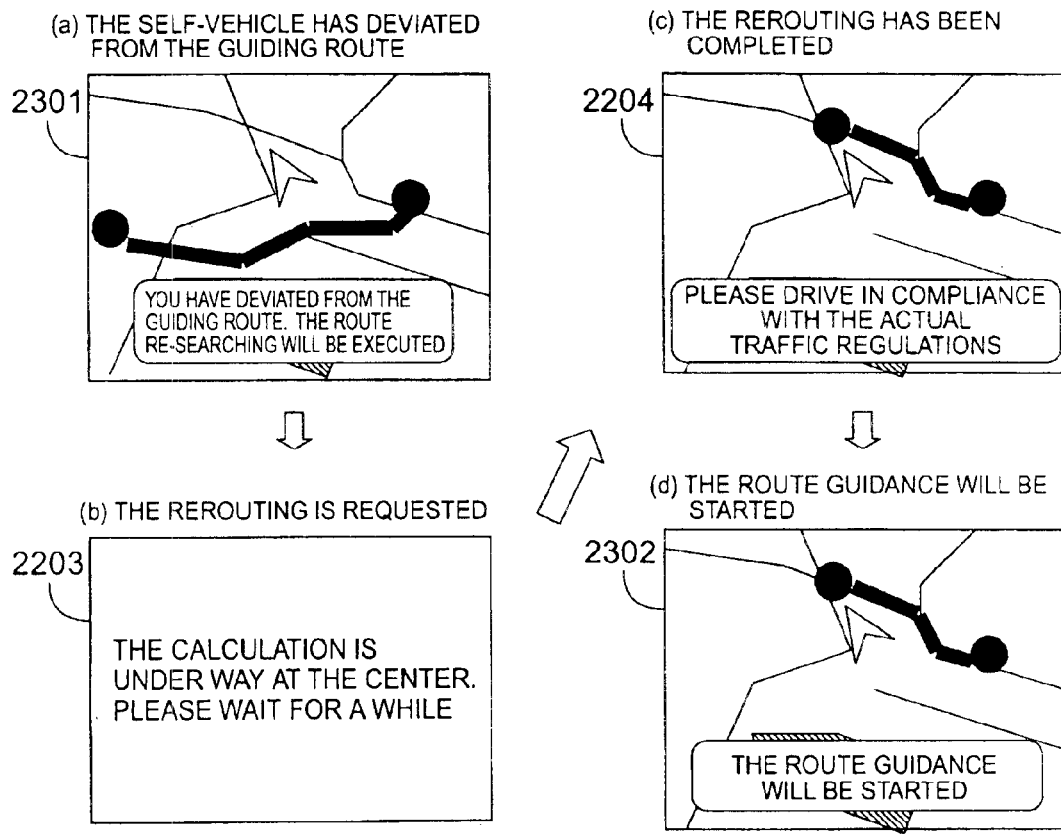
FIG. 28 is a diagram for illustrating the picture transition of the route re-searching.

FIG. 27 and FIG. 28 illustrate the picture transition in the case of the rerouting. FIG. 27 illustrates the case where the user stops the self-vehicle and then requests the rerouting. In FIG. 27, if the self-vehicle deviates from the guiding route, there appears a picture 2201. The picture 2201 displays a warning to the effect that the self-vehicle has deviated from the route, but does nothing more during the driving. At a point-in-time where the self-vehicle stops, the navi-terminal displays a picture 2202, thereby making an inquiry of the user as to whether or not to request the rerouting. If the user pushes the decision key of the remote controller, there appears a picture 2203, where the navi-terminal requests the route searching to the navi-server. When the navi-server has finished the route searching, the navi-server transmits the resultant route information to the navi-terminal, which displays a new guiding route as is illustrated on a picture 2204. Finally, there appears a picture 2205, where the user's pushing the decision key starts the route guidance. When the self-vehicle deviates from the route, prompting the user to perform the decision-key inputting during the driving results in a possibility that the user may be much absorbed in the operation of the navi-terminal. This brings about a danger of causing an accident to happen. Consequently, by refraining from prompting the user to perform the decision-key inputting during the driving, it becomes possible to suppress the possibility of an accident down to a low-value.

FIG. 28 illustrates the picture transition in the case of the automatic rerouting. In this case, if the self-vehicle deviates from the route, the rerouting is automatically executed. If the self-vehicle deviates from the route, there appears a picture 2301. Unlike the picture 2201, the picture 2301 displays a notice to the effect that the rerouting will be executed. The navi-terminal requests, to the navi-server, the route searching from the present place to the destination place, and there appears the picture 2203 in the meantime. If the navi-server has finished the route searching, there appears the picture 2204. Finally, there appears a picture 2302, which displays a notice to the effect that the route guidance will be started. In the case of the automatic rerouting, it can be considered that the self-vehicle is in an on-run state. Accordingly, the route guidance is started without prompting the user to perform the decision-key inputting. In the case of the automatic rerouting, since the access is made to the navi-server regardless of the user's will, the communications fee occurs for each access. However, the rerouting is executable without the inputting from the user. This brings about none of the danger that the user may be absorbed in the operation and thereby an accident will be caused to happen.

A voice may also be used as the rerouting method. If the self-vehicle deviates from the guiding route, there appears the picture 2201. At this time, the navi-terminal waits for the user to perform the voice inputting. If the user inputs a voice of "Reroute." with the use of a voice inputting device, there appears the picture 2203, where the navi-terminal requests, to the navi-server, the route searching from the present place to the destination place. When the navi-server has finished the route searching, the navi-server transmits the resultant route information to the navi-terminal, and there appears the picture 2204. Finally, there appears the picture 2302, which starts the route guidance. This method simplifies the inputting into the navi-terminal, and makes it possible to access the navi-server at the user's will.

Figure 26:
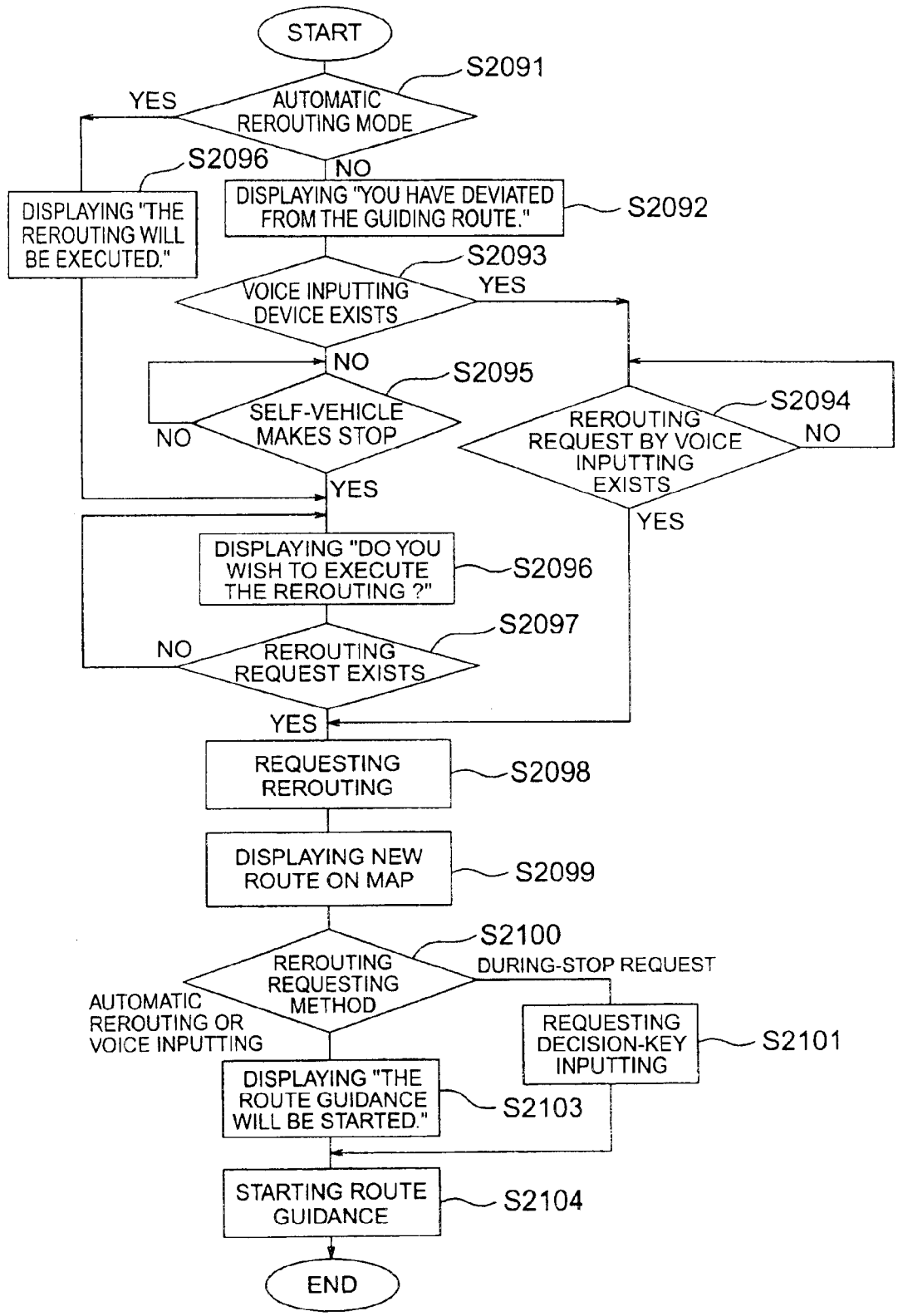
FIG. 26 is a flow diagram for a route researching.

Next, referring to a flow chart illustrated in FIG. 26, the explanation will be given again concerning the above-described processings. If the self-vehicle deviates from the route, the navi-terminal, at a step S2091, judges whether or not the present rerouting mode is the automatic rerouting mode. If the mode is the automatic rerouting mode, the navi-terminal displays, on the picture, the notice of "You have deviated from the guiding route. The route researching will be executed." regardless of whether the self-vehicle is in an on-run state or a stop state at a step 2096. This has been just illustrated on the picture 2301. After that, at a step S2098, the navi-terminal requests the rerouting.

In the case of no automatic rerouting, at a step S2092, the navi-terminal displays the notice of only "You have deviated from the guiding route." on the picture. This has been just illustrated on the picture 2201. Next, if, at a step S2093, the navi-terminal judges that there exists the voice inputting device, at a step S2094, the navi-terminal awaits the voice inputting. Moreover, if the user says "Reroute.", "Research.", or the like, at the step S2098, the navi-terminal requests the rerouting to the navi-server.

In the case of being neither the automatic rerouting mode nor the existence of the voice inputting device, the navi-terminal does nothing until the self-vehicle makes a stop while displaying the notice of "You have deviated from the guiding route." on the picture. If, at a step S2095, the navi-terminal judges that the self-vehicle makes the stop, the navi-terminal displays, on the picture, the notice of "Do you wish to execute the rerouting?", then awaiting the remote-controller inputting from the user. If the decision key is pushed, at the step S2098, the navi-terminal requests the rerouting.

If the rerouting has been requested in accordance with the above-described method, the navi-server transmits the rerouting result. Then, at a step S2099, the navi-terminal displays the new route in a state of being superimposed on the map. This has been just illustrated on the picture 2204. After displaying the new route on the picture, in the case of the automatic rerouting or the above-described rerouting by the voice, the navi-terminal displays the notice of "The route guidance will be started." or the like on the picture, thereby starting the route guidance. In the above-described case where the navi-terminal requests the rerouting after the self-vehicle has made the stop, the navi-terminal displays the notice of "The decision key will start the guidance." or the like. Then, after confirming that the decision key of the remote controller has been pushed, the navi-terminal starts the route guidance. Here, the picture displayed-contents need not necessarily be changed depending on the automatic rerouting request, the by-voice rerouting request, or the after-stopping rerouting request. Even in the case of the after-stopping rerouting request, after downloading the route data from the navi-server, the navi-terminal may start the route guidance without prompting the user to perform the decision-key inputting.

The judgement method of judging whether or not the self-vehicle position has deviated from the route may be made using the following criterions: The self-vehicle position has deviated from the route by 300 meters, or 30 seconds have elapsed since the position deviated from the route.

It is possible for the user to set the above-described rerouting modes. In the present embodiment, an example is presented where the user performs the setting by invoking setting pictures using the remote controller. FIG. 29(a) and FIG. 29(b) illustrate a main menu at the navi-terminal and a route searching setting menu, respectively. If the user pushes a "menu" key of the remote controller, there is displayed the main menu 2401 in FIG. 29(a). Moreover, the user's selecting a "setting" out of the main menu 2401 causes a setting menu 2402 to appear. Furthermore, if the user selects a "route searching setting" out of the setting menu 2402, there comes a picture in FIG. 29 (b). At this time, the picture displays the route searching setting menu 2403. The route searching setting menu 2403 includes a "route re-searching" setting menu, which makes it possible to set the rerouting mode. Of this menu, selecting an "automatic" brings about the automatic rerouting mode. Selecting a "voice" brings about the mode for allowing the execution of the by-voice-inputting rerouting request. Selecting "no setting" brings about the mode where the rerouting request can not be made until the stopping.

In addition to the route re-searching" setting menu, the route searching setting menu 2403 includes a "searching condition" setting menu. This menu sets the route searching condition at the time of executing the route searching, allowing the setting of the conditions such as the expressway priority, the general-road priority, the distance priority, and the time priority. Also, the route searching setting menu may also include a menu other than the above-described menus.

Figure 22:
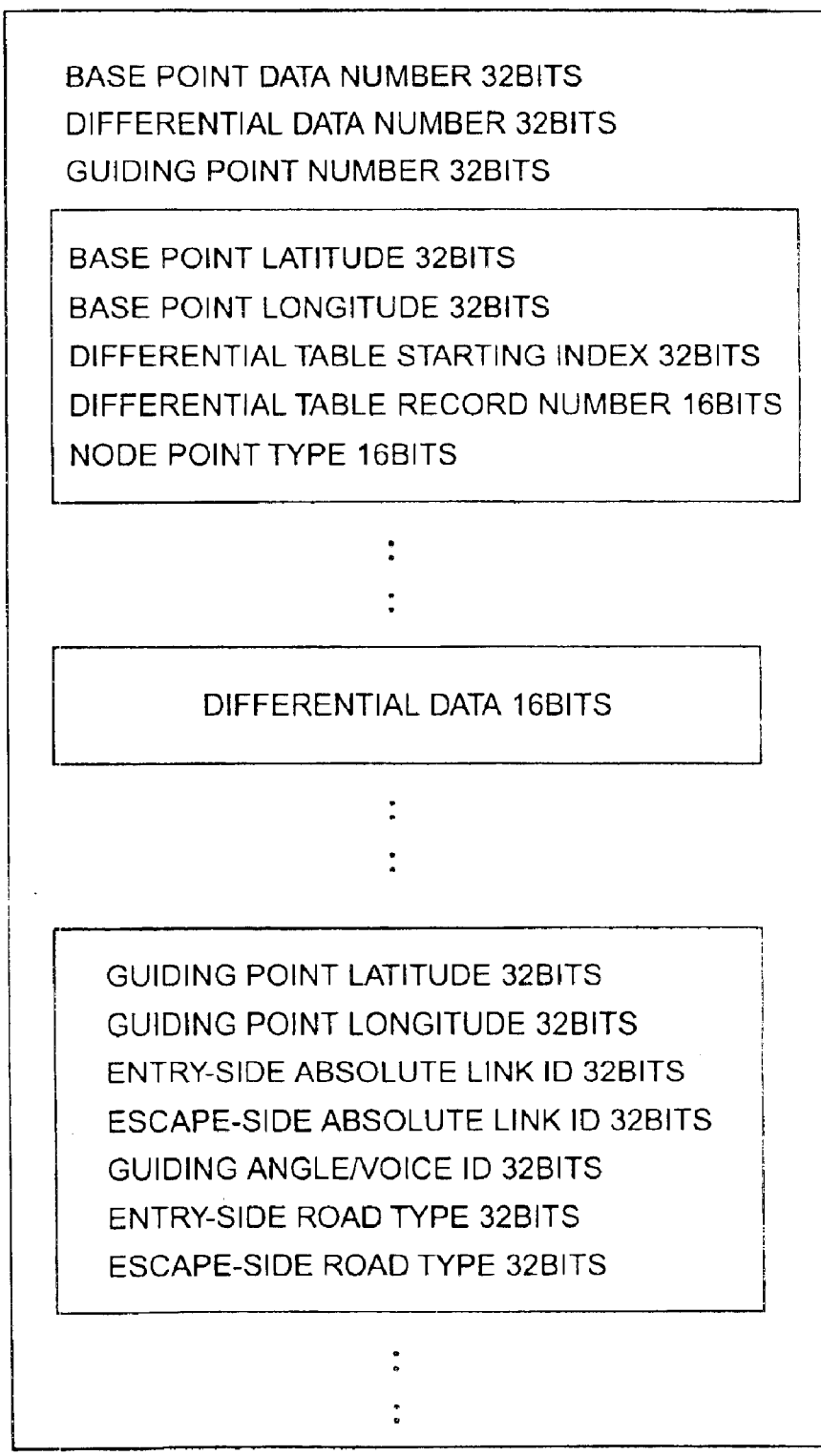
FIG. 22 is a diagram for illustrating a transmission format of a route searching result.

Next, the explanation will be given below regarding the transmitting formats of the route data and the guidance data. As described earlier, it is possible to transmit the route data or the guidance data in the manner of having been included in the HTML. The formats have been exactly illustrated in FIG. 21 and FIG. 22. FIG. 21 illustrates a route HTML 2041 for transmitting the route data to the navi-terminal. FIG. 22 illustrates the format of a route information file 2051. The file name of the route information file 2051 is beforehand described in the <embed> tag within the route HTML 2041. Then, if the navi-terminal receives the route HTML 2041, the navi-terminal downloads the route information file 2051, thereby starting up an application that is appropriate for processing the route information.

Figure 23:
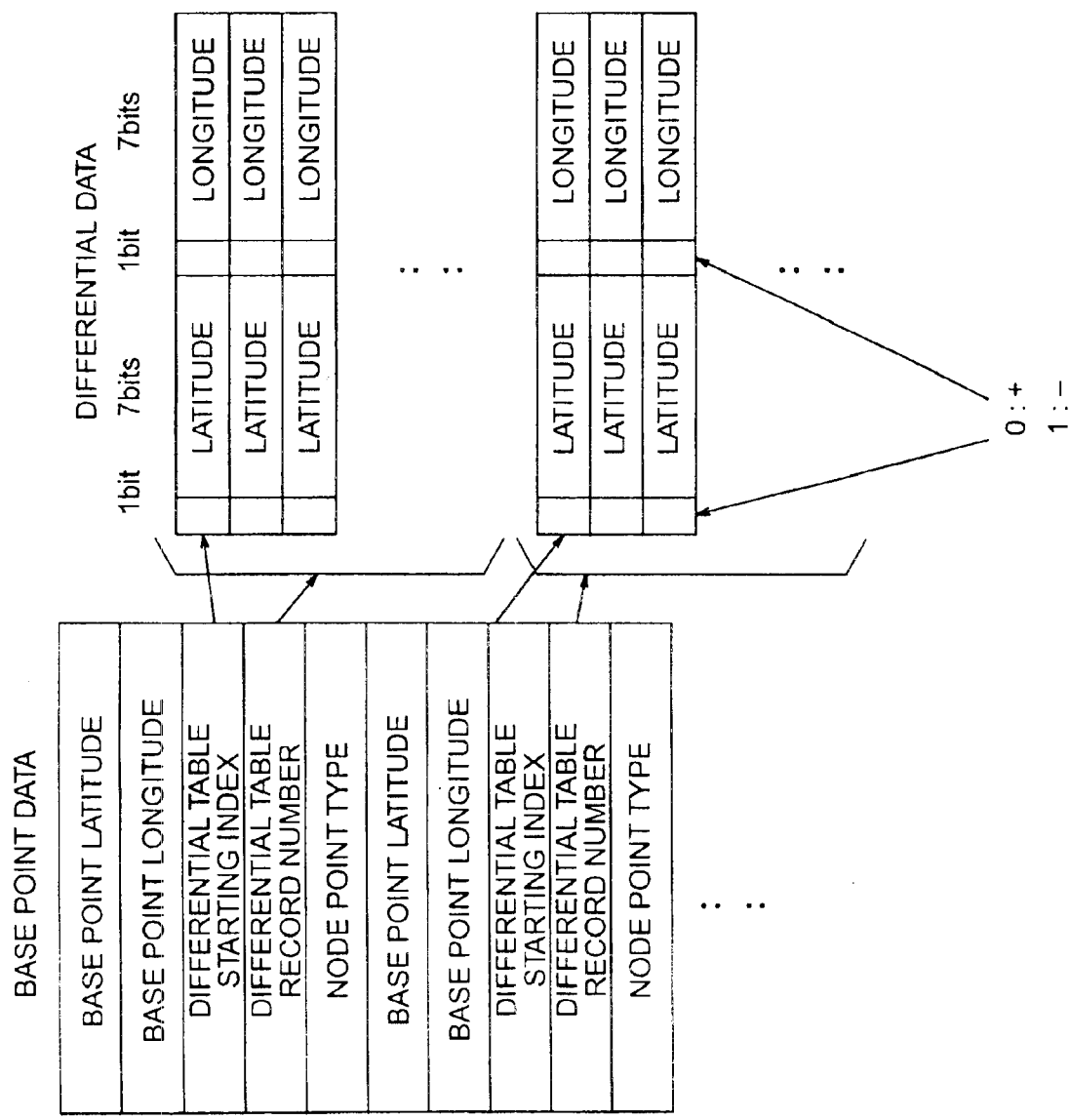
FIG. 23 is a diagram for illustrating a transmission format of a route searching result.

The route information file 2051 includes the route information and the guiding point information. The route information is expressed by base point data becoming a reference and the differences from the base point. FIG. 23 illustrates the relationship between the base point data and the differential data.

The base point data includes the latitude/longitude, a differential table starting index, a differential table record number, and a node point type. Of them, the differential table starting index indicates an index (i.e., position) on the memory where the differential data from the base point has been stored. The differential table record number indicates the number of the differences from the base point. Also, the latitude/longitude is stored in being converted into a numerical value in, e.g., a 1/10th-second unit. Depending on the convenience for the system, the employment of the numerical values is allowable where 16 bits, 8 bits, and 8 bits are assigned to the degree, the minute, and the second, respectively.

The differential data is expressed with 16 bits, where the higher-order 8 bits express the difference in the latitude and the lower-order 8 bits express the difference in the longitude. Also, the respective highest-order bit expresses a plus or a minus notation. It is preferable that the method for expressing this difference should be made identical to the method for expressing the above-described base point.

The base point is not always only one point on the route. Instead, a plurality of points can be the base points. For example, in the present embodiment, since the differences in the latitude/longitude are expressed with 8 bits each and the respective highest-order 1 bit is the notation, only the numerical values of 0 to 127 can be expressed. Consequently, in the case where the value of the difference exceeds 127, a base point is newly created. Also, the base point may be determined depending on the convenience for the system, e.g., a point-of-interest where the road type changes on the route is defined as the base point. Determining the base point in this way results in a reduction in the data amount and a lowering in the communications charge as compared with the case where the latitude/longitude of a pass point on the route are transmitted just as they are.

The guiding point information included in the route information file 2051 includes a voice data ID. The voice data ID means the ID of voice data that the navi-terminal should reproduce when the navi-terminal approaches a guiding point. If the navi-terminal approaches the guiding point, with a voice, e.g., "Please makes a left turn 300 meters ahead." or "Please turn to the left soon.", the navi-terminal informs the user of the direction to which the self-vehicle should make the turn. The navi-server executes the processing of assigning the ID to the voice.

Figure 24A:
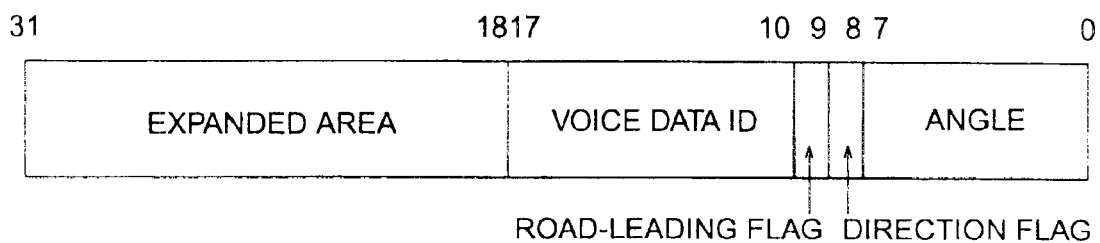
FIGS. 24A and 24B are diagrams for illustrating a transmission format of a route searching result.
Figure 24B:
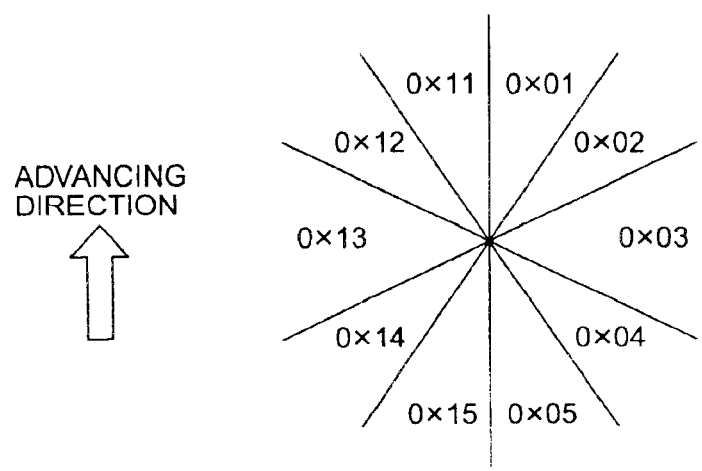

The voice data ID is included in the guiding angle/voice ID in the route data 2051, and its format has been exactly illustrated in FIG. 24A. Incidentally, the unused area may be provided in order to comply with a software expansion at the navi-terminal side. Also, the manner in which the voice data ID is assigned has been exactly illustrated in FIG. 24B. In the present embodiment, there is presented an example where the voice data ID is expressed with hexadecimal two-digit codes. The higher-order 4 bits express the right or the left, and the lower-order 4 bits express the angles.

Incidentally, although, in the present embodiment, the navi-server determines the voice data ID and transmits the ID to the navi-terminal, as is the case with the conventional car navigation system, the navi-terminal side may carry out the processing of determining the voice data ID from the guiding angle.

Figure 30:
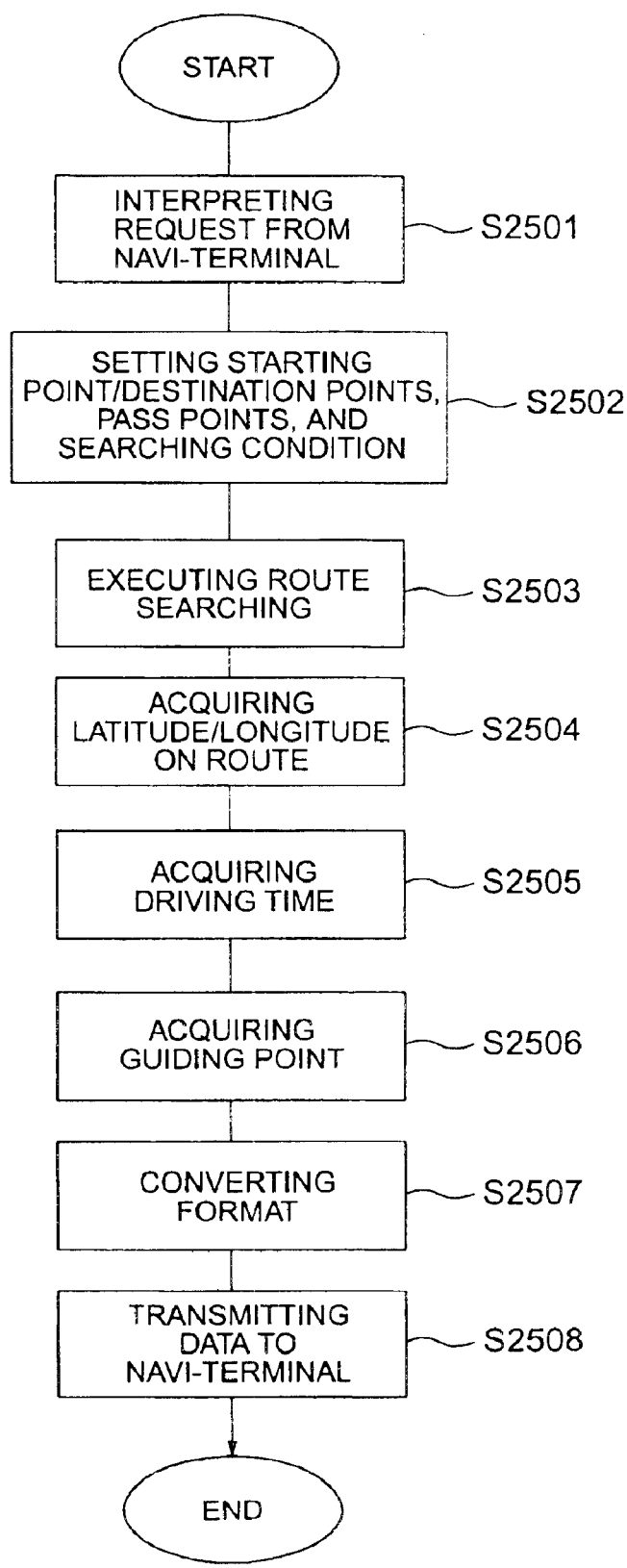
FIG. 30 is a server-side processing flow diagram for the route searching.

The operations explained in the embodiments so far are the processings that are mainly seen from the navi-terminal side. Next, referring to FIG. 30, the explanation will be given below concerning the processings at the navi-server. Additionally, the software configuration of the navi-server has been already illustrated in FIG. 2, and the explanation thereof has been also just given as described earlier. The navi-server receives various types of requests from the navi-terminal, then starting up an application that is appropriate for the received request. Conversely, although the navi-server can actively issue some type of information to the navi-terminal with the use of the broadcasting or the like, the subject will be omitted here.

At first, the navi-server interprets a request received from the navi-terminal. This request is transferred to the navi-server as the CGI parameter, and, at a step 2501, the CGI 115 interprets this request. The request received from the navi-terminal includes at least the latitudes/longitudes of the starting point/destination point and the latitude/longitude of a pass point in the route searching. Regarding the route searching condition, if the navi-terminal side holds the condition, the navi-terminal may transmit to the navi-server the condition along with the request. Otherwise, the navi-server may store the route searching condition from the beginning. In the latter case, the navi-server makes reference to the optional information database 126 inside the route searching navi-server 116, thereby executing the route searching.

Next, the navi-server, at a step 2502, sets the latitudes/longitudes of the starting point/destination point, the latitude/longitude of the pass point, and the searching condition, then starting the route searching at a step 2503. The output of the route searching includes the latitude/longitude of the pass point, the driving time, the guiding point information, and the like. The CGI 115, at steps 2504 to 2506, acquires these pieces of information from the route searching navi-server 116, then converting the information into the HTML at a step 2507. The formats of this HTML have been just illustrated in FIGS. 21 to 23. Finally, the navi-server transmits this HTML to the navi-terminal, thereby finishing the processings at the navi-server.

The present navi-terminal has the communications function for downloading the map data from the navi-server and a rewritable storage medium utilized as a cache for recording wide-area map data recorded at the time of shipment and the detailed map data acquired via the communications so far. In the case where a map-displaying request for a specified point-of-interest occurs while the navi-terminal is being used, the navi-terminal reads out the map data recorded in the built-in storage medium, thereby displaying the map. If all the necessary data has been not recorded in the storage medium, the navi-terminal issues a map request to the navi-server so as to download and display the map data.

Figure 42:
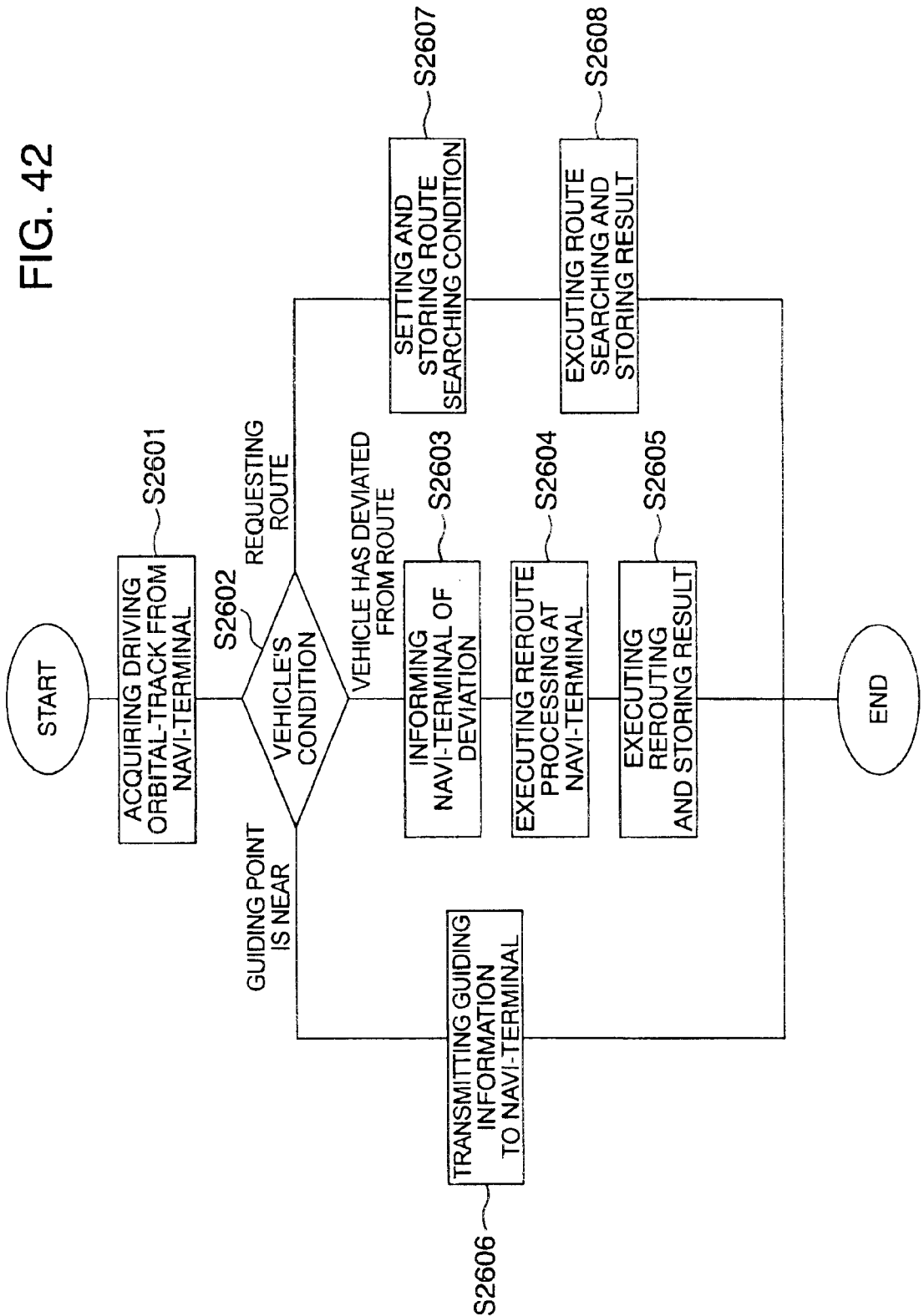
FIG. 42 is a flow chart for transferring the driving orbital-track of the user vehicle to a center at the time of requesting the route.

When requesting the route searching, in the case as well where there exists no detailed information in the navi-terminal, the navi-terminal can obtain some level of service. For example, even if the self-vehicle is now in an on-run state at a location whose detailed map does not exists in the navi-terminal, the navi-terminal transmits the driving orbital-track so far to the navi-server simultaneously with the route searching request. Then, the navi-server side processes the driving orbital-track, thereby allowing the navi-terminal to receive some services. The latitudes/longitudes of locations that the self-vehicle has passed so far may be used as the driving orbital-track. Its embodiment will be explained below, referring to FIG. 42.

At a step 2601, the navi-server receives the driving orbital-track and also some other request, if any. The navi-server makes a comparison between the map information stored in the navi-server and the driving orbital-track received, thereby grasping the vehicle condition of the navi-terminal mounting self-vehicle (S2602). At the same time, based on the driving orbital-track, the navi-server can recognize in what place and in what direction the self-vehicle is now being driven. Consequently, when requesting the route searching, the transmission of the driving orbital-track as well as the destination information to the navi-server permits the navi-server to search, at a step 2608, the optimum route about which the advancing direction has been taken into consideration.

The navi-server stores the driving orbital-track transmitted and, at a step 2607, analyses a road type on which the user drives so often. This, at the step 2608, makes it possible to search the route that is appropriate therefor. For example, if it is found that a user drives along national highways so often, when the user issues a route searching request to the navi-server, the navi-server can search the route with a higher-priority given to the national highways. Otherwise, if a user drives on back streets so often instead of driving along wider streets, the navi-server can execute the route searching with a higher-priority given to narrow city streets instead of the national highways or the like, then being capable of returning the result back to the navi-terminal. Moreover, the navi-server stores the route searching condition at that time, and if the same user issues a route searching request the next time or after, the navi-server can execute the route searching on the basis of the same route searching condition.

Also, if the navi-server has stored the route information, it also becomes possible to carry out the route guidance. For example, if the navi-server side finds the navi-terminal coming nearer to a guiding point, at a step 2606, the navi-server can inform the navi-terminal that the guiding point is coming soon and also in which direction the self-vehicle should advance. At that time, the navi-terminal displays the direction in which to advance on the picture with an arrow. In addition, if there exists the voice data in the navi-terminal, the navi-terminal may have the navi-server transmit the voice data ID and may give the voice guidance at the navi-terminal side.

Also, the navi-server has stored the route information on the user, and then makes a comparison between the route information and the driving orbital-track transmitted from the user. This makes it possible to recognize whether or not the self-vehicle position has deviated from the route. If the position has deviated therefrom, the navi-server informs the navi-terminal of a notice to the effect (S2603), and the navi-terminal side carries out the reroute processing (S2604). This has been just as described earlier. After that, if the navi-terminal transfers a rerouting request to the navi-server, at a step 2605, the navi-server may carry out the rerouting and, using its result, may continue the above-described processing stored in the navi-server. At that time, it is also possible to inform the navi-terminal that the position has deviated from the route.

In this way, even when there exists no map in the navi-terminal side, or the navi-terminal fails in downloading the necessary map, the navi-terminal can receive the route guiding service. It can be considered, however, that transmitting, as the driving orbital-track, all the orbital-track data in one driving may increase the communications load. In that case, the communications load can be reduced by the following, for example: In a location where the self-vehicle has been driving almost straight, the orbital-track point-string is thinned out, or the 2-kilometer orbital-track data in the past is transmitted.

Figure 31:
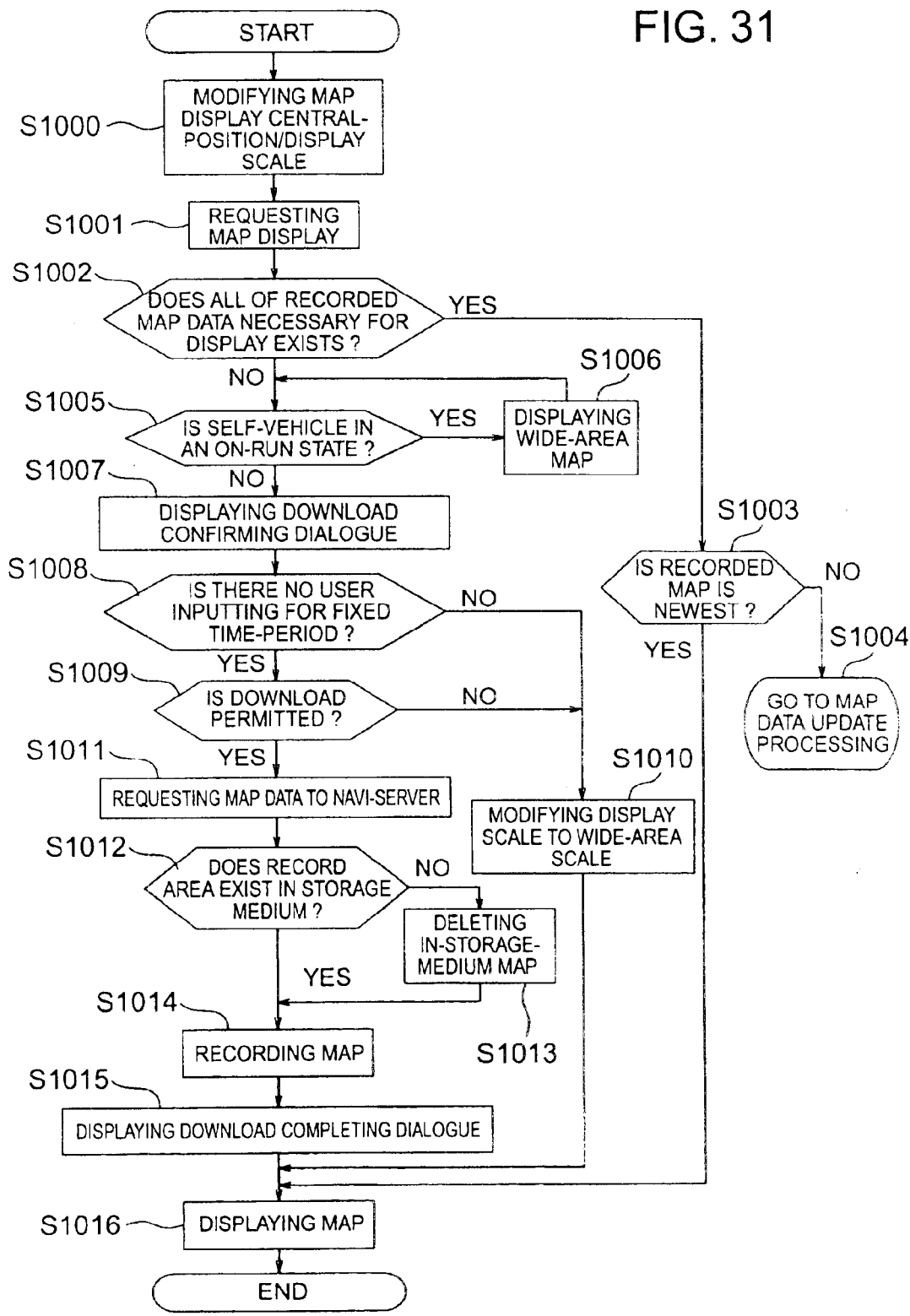
FIG. 31 is a processing flow chart at the time of requesting a map.
Figure 32:
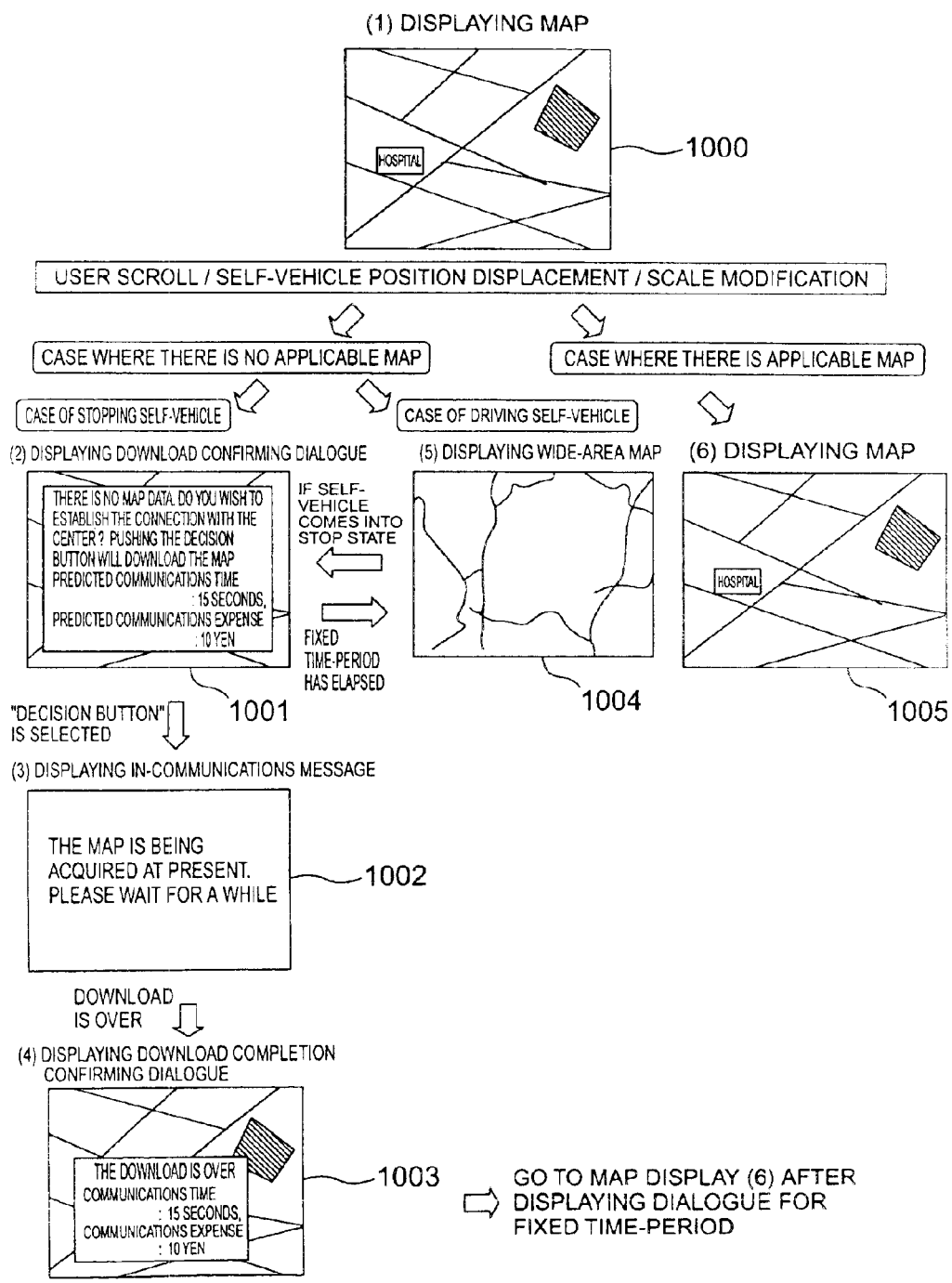
FIG. 32 is a diagram for illustrating an example of the picture transition at the time of requesting the map.

Referring to FIG. 31 that illustrates a map request processing flow at the navi-terminal side and FIG. 32 that illustrates an example of the corresponding picture transition, the detailed explanation will be given below concerning the flow and the example.

At the navi-terminal, if a scroll by the user, an automatic scroll during the self-vehicle driving, and a scale modification by the user, as a trigger (S1000), cause a specified point-of-interest map-displaying request to occur (S1001), it is confirmed whether or not all the map data needed for the display has been recorded in the storage medium (S1002).

When all the map data needed for the display has been recorded in the storage medium, it is confirmed whether or not the recorded map data is the newest data (S1003). If the recorded map data is not the newest, an update processing of the map data is performed (S1004). If the map data is the newest, the map 1005 is displayed just as it is (S1016).

Meanwhile, when all the map data needed for the display has been not recorded in the storage medium, it is confirmed whether or not the self-vehicle is now in an on-run state (S1005). In the case of being in the on-run state, the output of a map download confirming dialogue 1001 is prohibited. Then, a wide-area map 1004 is displayed in such a manner that its scale is made larger up to an extent of being able to be displayed only with the map data recorded in the storage medium (S1006). Moreover, the download confirming dialogue 1001 is displayed after having waited for the self-vehicle to come into a stop state.

In the case where the self-vehicle is in no on-run state, there is displayed the dialogue 1001 for confirming the user as to whether or not the lacked map data should be downloaded from the navi-server (S1007). During the dialogue, a predicted value of the communications fee is displayed. After displaying the dialogue, if the user has performed no inputting for a certain fixed time-period and if the user has not selected the downloading, the display scale is automatically modified (S1010), then displaying the wide-area map 1004.

After having downloaded the map data or the route guidance data, on its each-time basis, the navi-terminal displays the actual communications fee and contents fee. The fees are withdrawn from the credit account or bank account of the user in a monthly unit, then being settled. Also, if the upper-limits of the fees are registered in advance from the navi-terminal into the navi-server, at a point-in-time when the upper-limits are likely to be exceeded, the navi-server informs the navi-terminal of a notice to the effect. This notice makes it unnecessary for the user to worry about too much usage of the downloading. The upper-limit of the communications fee and that of the contents fee can be set independently of each other. Also, an inquiry can be made from the navi-terminal to the navi-server as to about what amount the usage fees have reached, e.g., this month.

At the map download confirming dialogue 1001, if the user selects the downloading, the navi-terminal requests the lacked map data to the navi-server (S1011), then displaying a picture 1002 for notifying that the communications are under way. After the completion of the downloading, it is confirmed whether or not an enough area for recording the downloaded map data exists within the storage medium (S1012). If the enough area exists, the map data is recorded (S1014). If the storage area is lacking, the map data is deleted within the storage medium in the sequence starting from the oldest reference time-and-date (S1013), thereby securing an area for storing the newly downloaded map data. After that, the map data is recorded (S1014). After recording the map, the navi-terminal displays a download completion notice and the cost communications fee at a dialogue 1003 (S1015), then displaying the map 1004 (S1016).

Figure 33:
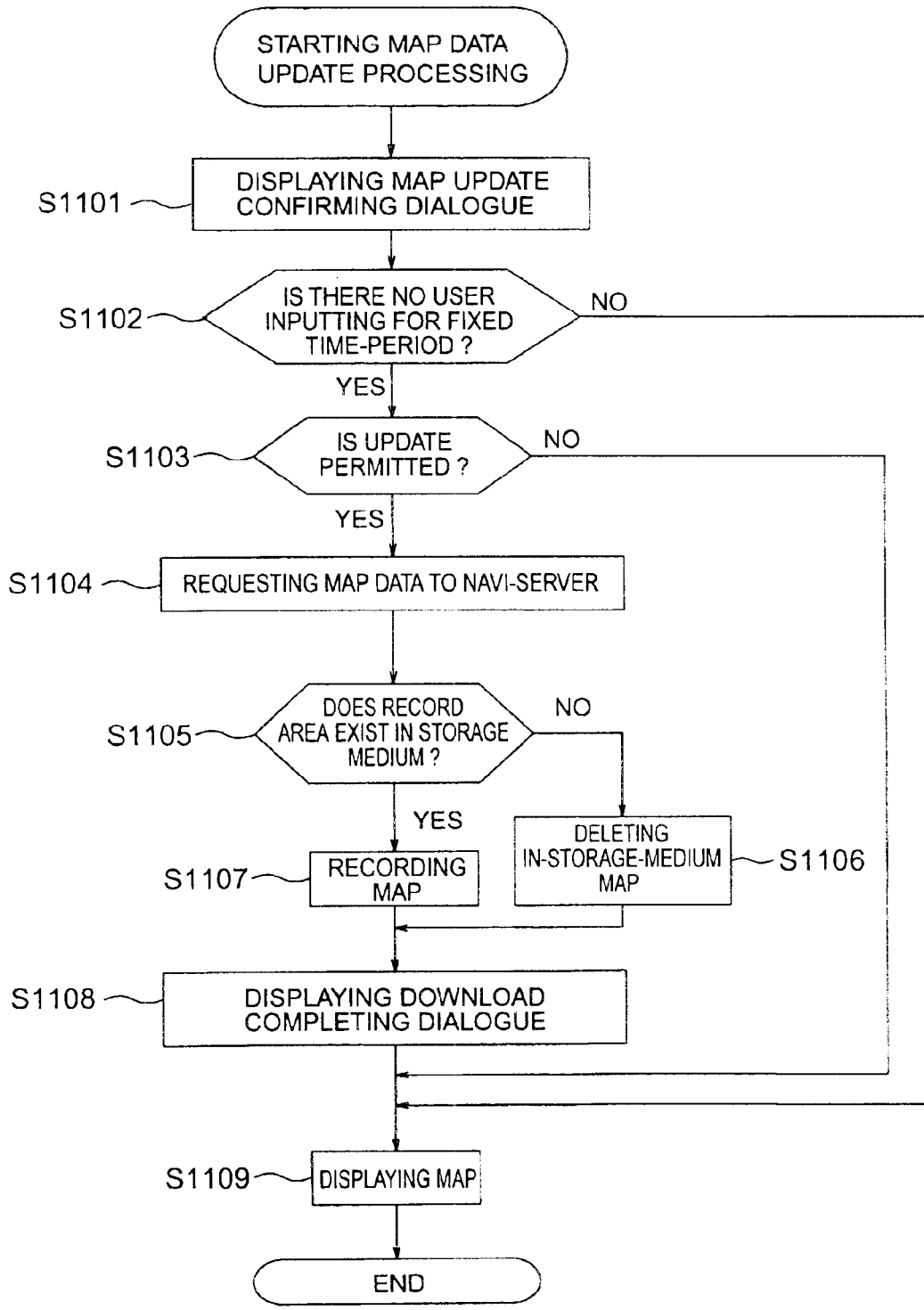
FIG. 33 is a processing flow chart at the time of updating the map.
Figure 34:
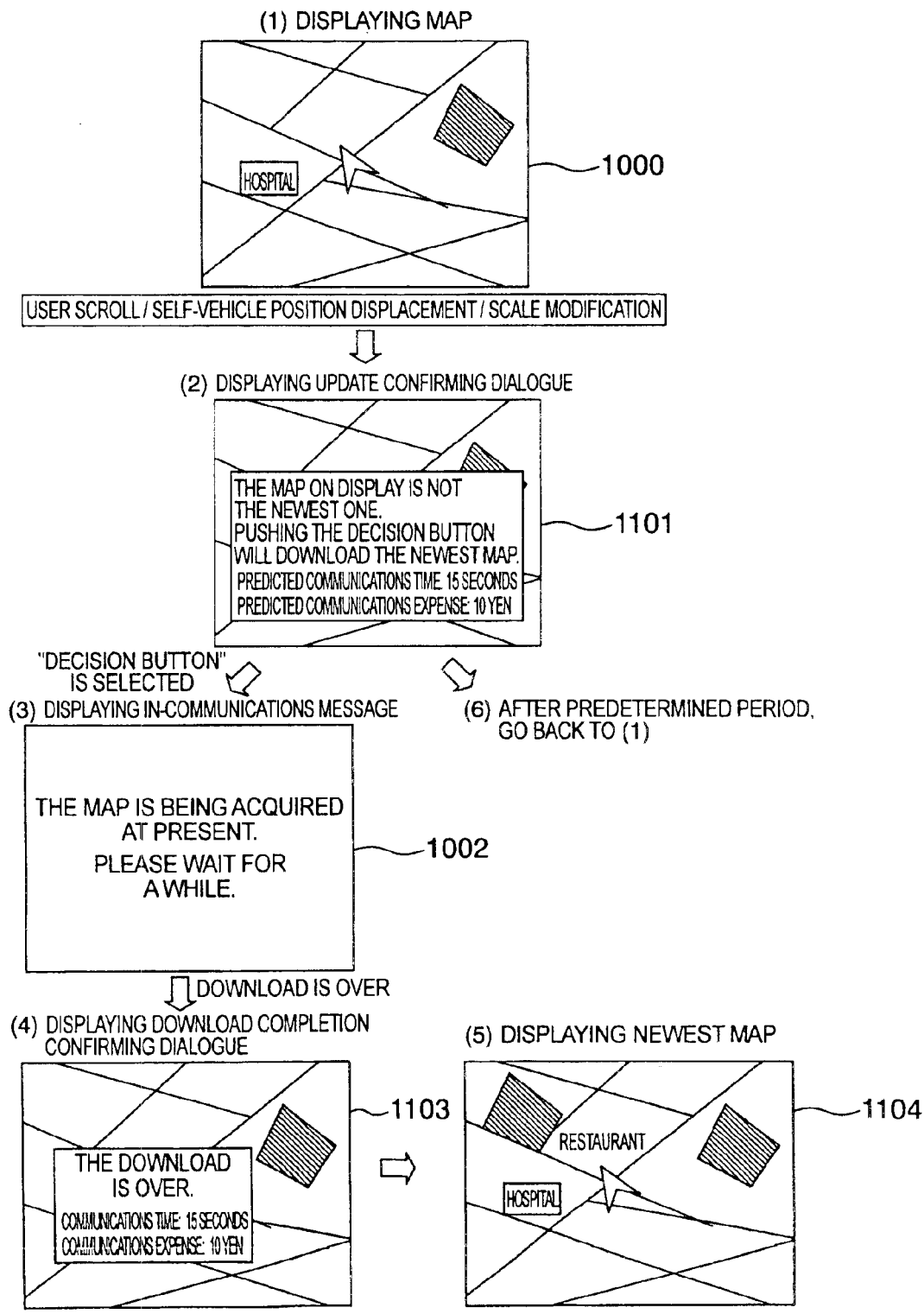
FIG. 34 is a diagram for illustrating an example of the picture transition at the time of updating the map.

Next, the detailed explanation will be given below regarding the map update processing, referring to FIG. 33 that illustrates the processing flow and FIG. 34 that illustrates an example of the corresponding picture transition. At first, if the map update processing is started (S1004), a map update confirming dialogue 1101 is displayed (S1101). After that, if no inputting has been performed for a certain fixed time-period (S1102) and if the user has not permitted the updating (S1103), the existing map is displayed instead of updating the map (S1109). If the user has permitted the updating, the navi-terminal requests, to the navi-server, the map data on the position, the scale, and the area which are on display at present (S1104). When updating the navi-map, in addition to a scheme of transmitting all the cut-out map data to the navi-terminal, the navi-server can also employ the following scheme: A version that user owns is acquired, then transmitting only differential information between the map data in the version and the map data within the navi-server. What is referred to as "differential information" here includes added road information and point-of-interest information.

Processings (i.e., S1105 to S1108) to be performed after downloading the map data will be omitted, because they are equivalent to the processings (i.e., S1012 to S1015) performed after downloading the map data in the map request processing.

Figure 35:
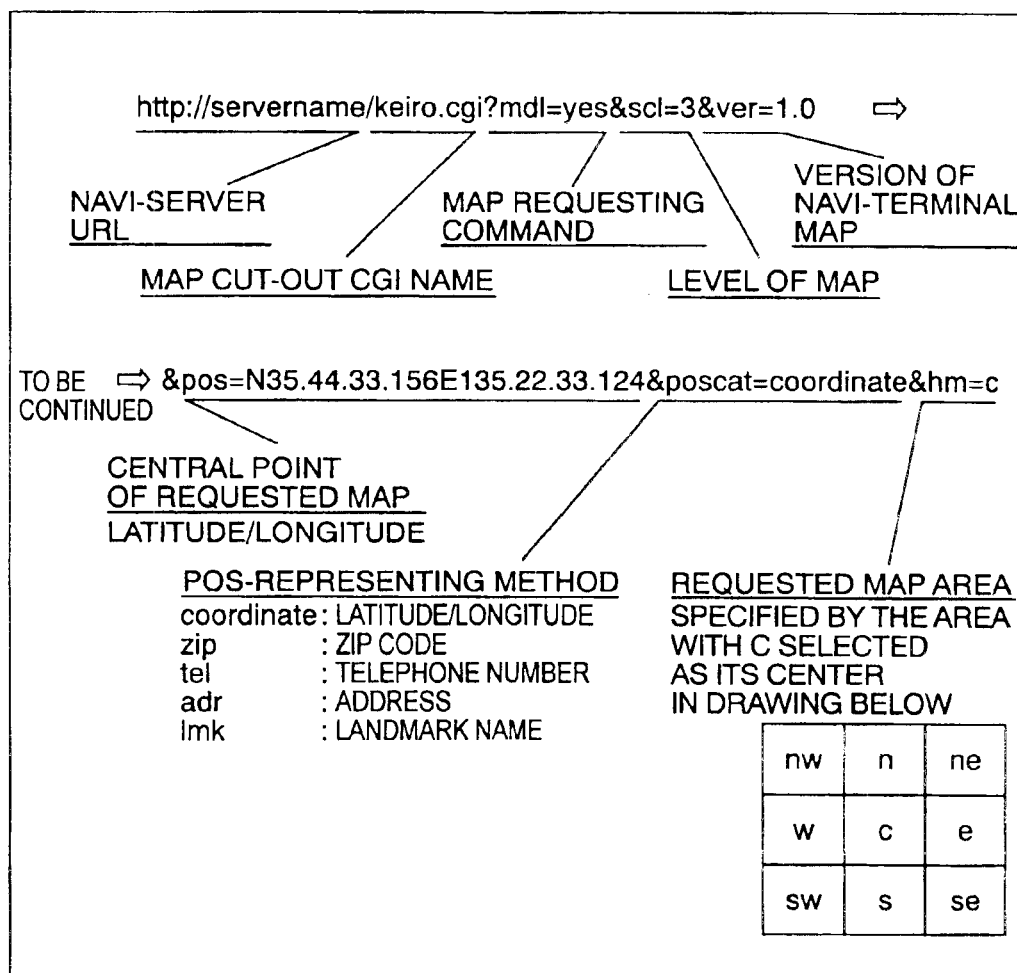
FIG. 35 is a diagram for indicating a URL at the time of requesting the map.
Figure 36:
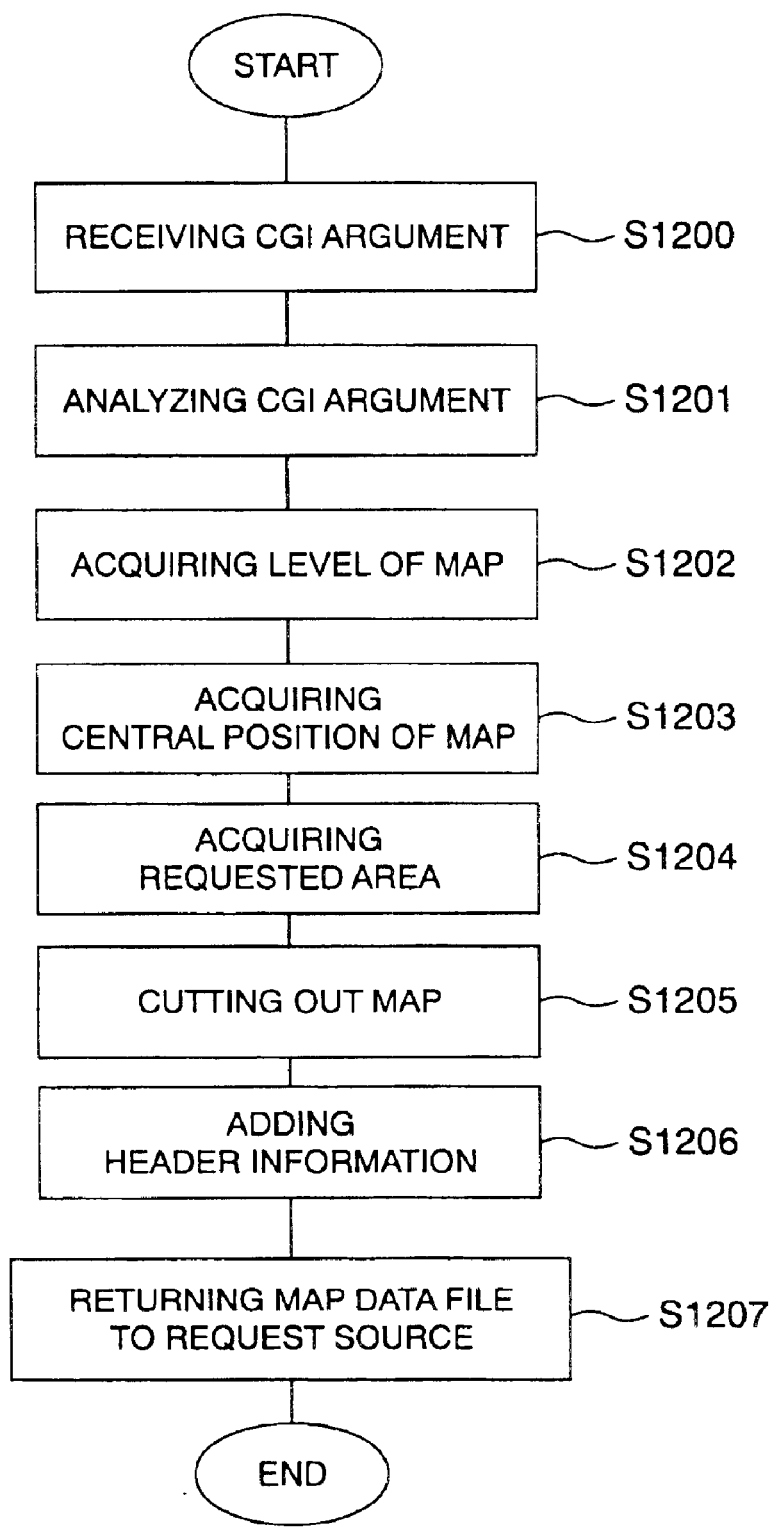
FIG. 36 is a processing flow chart at the time of cutting out the map at the navi-server.

Next, referring to FIG. 35 and FIG. 36, the explanation will be given below concerning the communications scheme between the navi-terminal and the navi-server. In the above-described processing of requesting the lacked map data to the navi-server (S1011), the navi-terminal describes, as arguments of the CGI as illustrated in FIG. 35, the map requesting command, the position of a point-of-interest to be displayed, the expressing method thereof, the scale of the map data, and a requested area, then requesting the map to the navi-server via the Internet. As the method of expressing the point-of-interest to be displayed, any one of the latitude/longitude, the address, the zip code, the telephone number, and the landmark name is selectable.

Figure 37:
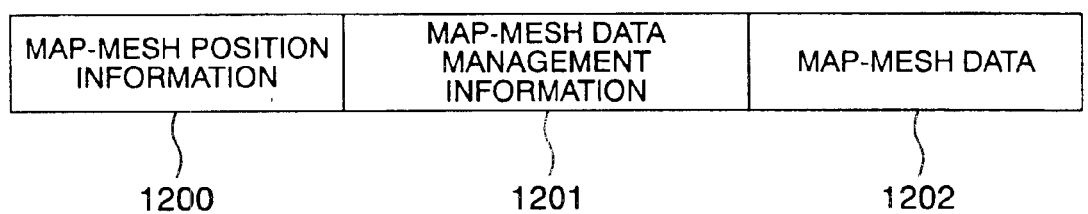
FIG. 37 is a diagram for indicating a map-data file format.
Figure 38:
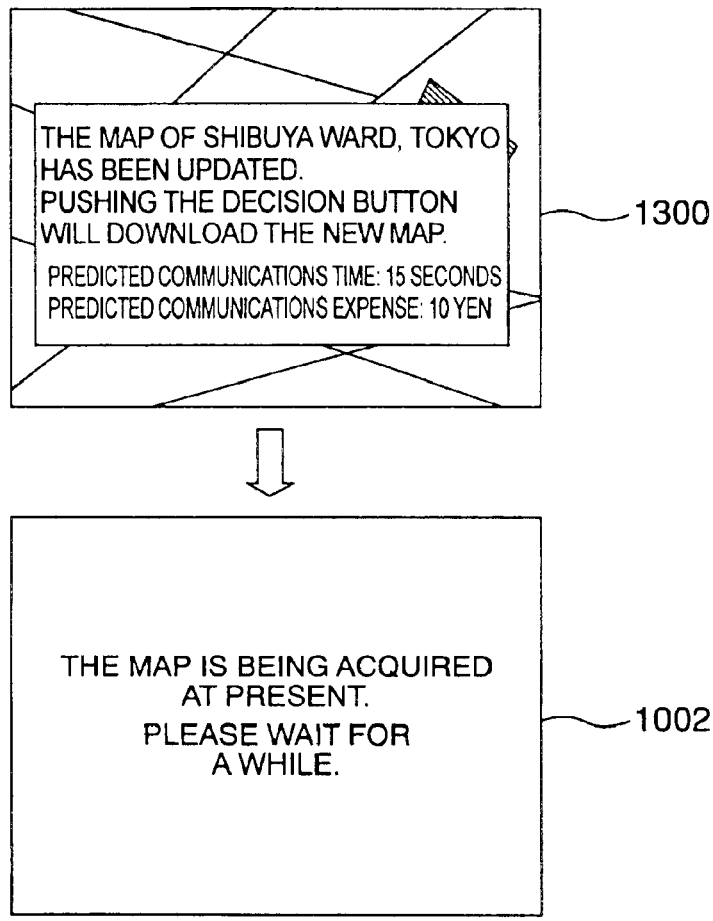
FIG. 38 is a diagram for illustrating an updating-notifying picture when the map at the navi-server is updated.

Having received the request (S1200), the navi-server analyzes the arguments of the CGI (S1201), thereby acquiring the level of the map (S1202), the central position of the map (S1203), and the requested area (S1204). After the acquisition, the navi-server cuts out the determined map data from the map database (S1205), and adds a header thereto (S1206), then transmitting the map data to the navi-terminal, i.e., the request source (S1207). FIG. 37 illustrates the file format to be transmitted. The file format to be transmitted includes map-mesh position information 1200, map-mesh data management information 1201, and map-mesh data 1202. The map-mesh position information 1200 includes the center of the cut-out map-mesh data. The map-mesh data management information 1201 includes the size of the map-mesh data. The map-mesh data 1202 includes the background data, the road configuration data, the road type data, and the name data for displaying the map.

Next, the description will be given below regarding a scheme of notifying the updating of the in-navi-server map database. With any one of the timings described below, the navi-terminal notifies the user of whether or not to update the map. After the notice, if the user permits the updating, the navi-terminal performs the above-described map update processing, 1) At the Time of Displaying the Map When displaying the map, it is confirmed whether or not the map data to be used is the newest data. The confirmation as to whether or not the data is the newest is performed as follows: The data stored within the storage medium is read out, and then a comparison is made between the data's version and the in-navi-server map information that the navi-terminal has acquired in advance from the navi-server. The navi-server-side map information that the navi-terminal holds here includes the version of the entire map database and the version on each map-mesh basis. The navi-server-side map information is acquired from the navi-server when the connection is first established with the navi-server after the use of the present navi-terminal was started, or on a certain fixed time-period basis. This makes it possible to update only the updated map-mesh.

2) At the Time of Modifying the In-Navi-Server Map

When the map database is updated at the navi-server, the navi-server notifies the user of an updated area via the navi-terminal. If the user wishes to update the map data on the notified area, the user performs the communications so as to download the new map.

3) At the Time of Having Updated the User-Held Data Out of the Map Data on the Navi-Server The navi-server has managed beforehand the version of the map data held by the user in a map-mesh unit. If, of the map data held by the user, map data in a certain area is updated, the navi-server, via the navi-terminal, notifies the user that the map data has been updated.

When performing the downloading, there is transmitted only differential information between the data held by the user and the in-navi-server data. What is referred to as "differential information" here includes added road information and point-of-interest information. In this scheme, the navi-terminal periodically notifies the navi-server of the map data held by the user and the version thereof.

In the method described so far, although, when acquiring the map from the navi-server, the confirmation has been performed toward the user without fail, modifying the setting of the navi-terminal makes it possible to download the map automatically.

Figure 39:
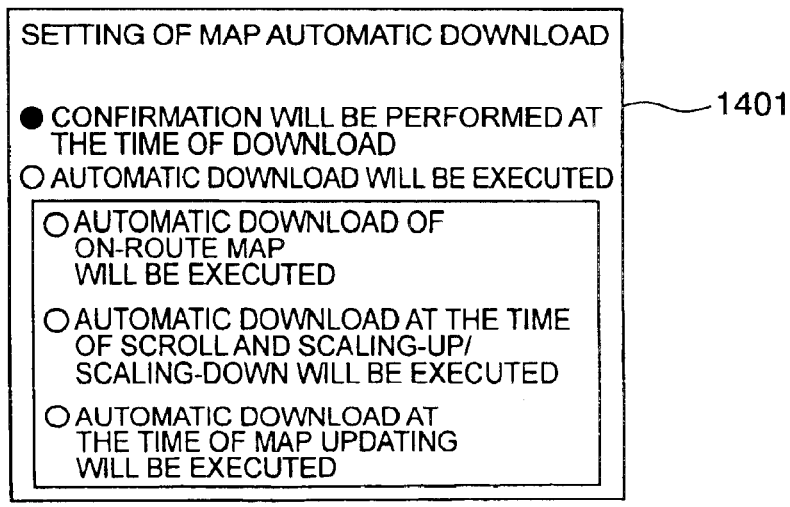
FIG. 39 is a diagram for illustrating a setting picture for a map automatic download.

FIG. 39 illustrates a setting-modifying picture regarding the map download. The user can select either "confirmation will be performed at the time of download" or "automatic download will be executed". If "confirmation will be performed at the time of download" is selected, just as described so far, the download confirming dialogue is displayed without fail at the time of the communications. If "automatic download will be executed" on the setting picture is selected, the communications will be started without displaying the dialogue, thereby downloading the map data. Moreover, by checking, on the setting picture, checking buttons of "automatic download of on-route map will be executed", "automatic download at the time of scroll and scaling-up/scaling-down will be executed", or "automatic download at the time of map updating will be executed.", it becomes possible to select the case where an automatic download is wished to be executed.

If "The automatic download of the on-route map will be executed." is selected, during the route guidance and within the map data in the destination-place direction from the self-vehicle position on the route, the map data that does not exist within the built-in storage medium is retrieved, thereby downloading the map data automatically.

Figure 40:
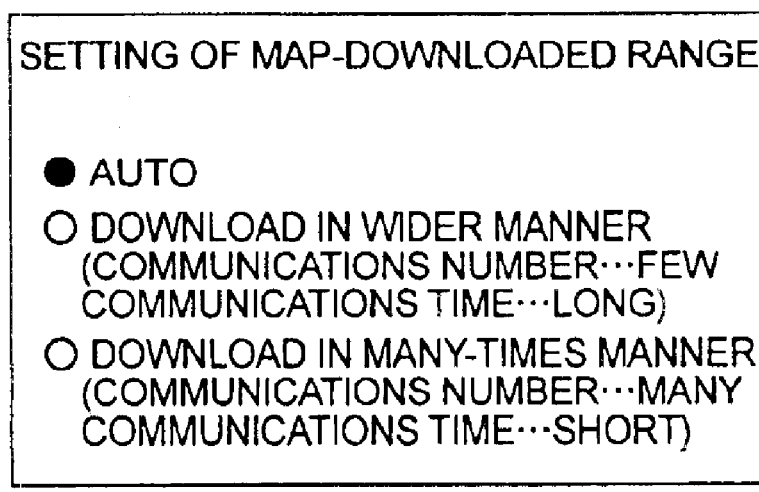
FIG. 40 is a diagram for illustrating a setting picture for the map download range.

Next, the explanation will be given regarding an area setting at the time of downloading the map. A map downloaded-area setting picture in FIG. 40 makes it possible to modify the setting of a map area subjected to the area-set downloading in the map to be downloaded. The setting is selectable from among "auto", "download in wider manner", and "download in many-times manner".

If "auto" is selected, depending on the driving state, the navi-terminal dynamically modifies the map area to be downloaded. For example, the map area to be downloaded is made larger during a high-speed driving, thereby making it possible to decrease the number of the communications per a fixed time-period.

Figure 41:
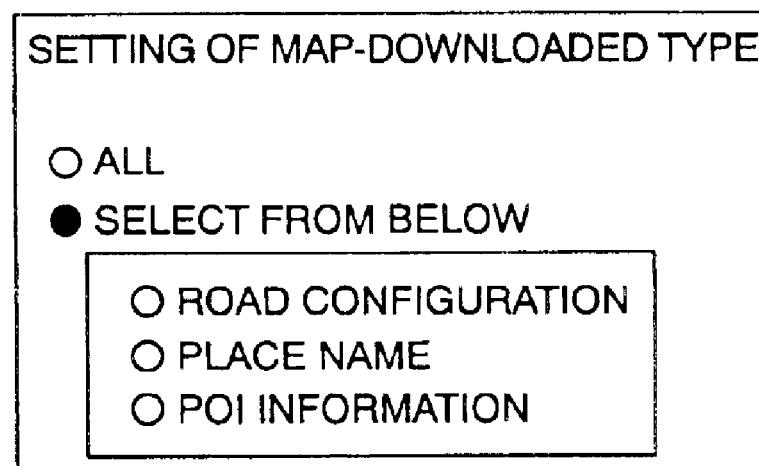
FIG. 41 is a diagram for illustrating a setting picture for the map download type.

Next, the explanation will be given regarding a scheme where the downloading is performed in a mode of selecting a configuration element within the map information. Although the map database within the navi-server includes the plurality of elements such as the road configuration, the background, the place name, and the point-of-interest name, all the information are not necessarily needed in displaying the map. Acquiring all the information from the navi-server allows the detailed information to be displayed, but necessitates the communications fee. Accordingly, in the present embodiment, a setting picture illustrated in FIG. 41 makes it possible to select a map element to be downloaded.

The present invention allows the communications-type car navigation system to be implemented with a small data transfer amount. Also, the present invention permits the implementation of the communications-type car navigation system that brings about an enhancement in the driving safety and the driving operability.

It should be further understood by those skilled in the art that the foregoing description has been made on the embodiments of the present invention and that various changes and modifications may be made in the invention without departing from the spirit of the invention and the scope of the appended claims.

What is claimed is:

1. A communications-type navigation device, comprising:
   a position measuring unit which measures a position of a self-terminal device;
   a destination place setting unit which sets destination place information;
   a communicator which performs transmission/reception of map data including at least one of wide area map data and detailed map data with an information center;
   a route guide which performs route guidance to said destination place; and
   a driving state monitor which monitors a driving state of a self-vehicle,
   wherein said communicator transmits, to said information center, present place information obtained by said position measuring unit, said destination place information as set by said destination place setting unit and download area information, which is modified dynamically depending on the driving state of the self-vehicle indicated by said driving state monitor, to download a larger area of map data when the self-vehicle is operated at high speed, and receives route information and guiding point information up to said destination place which have been transmitted from said information center, and
   wherein said route guide includes a judging unit which judges whether or not said self-terminal device has deviated from said route from said received route information and said position information measured by said position measuring unit, and a determining unit which determines, if said self-terminal device is judged to have deviated, whether or not to request said information center to perform a route calculation to said destination place according to an input to a prompt by a user in correspondence with said driving state detected by said driving state monitor.

2. The communications-type navigation device as claimed in claim 1, wherein said route guide includes said judging unit whether or not said self-terminal has deviated from said route from said received route information and said position information measured by said position measuring unit, and judging unit, if said self-terminal is judged to have deviated, whether or not said self-terminal is in an on-run state, and for prohibiting, if said self-terminal is in said on-run state, said route calculation to said destination place from being requested to said information center.

3. The communications-type navigation device as claimed in claim 2, wherein said route guide further includes judging unit that said self-vehicle has changed from said on-run state into a stop state so as to confirm a user as to whether or not to request said information center to perform said route calculation to said destination place.

4. The communications-type navigation device as claimed in claim 1, wherein said route guide provides a mode of automatically requesting said information center to perform said route calculation to said destination place when said self-terminal has deviated from said route, and a mode of confirming a user as to whether or not to request said information center to perform said route calculation to said destination place when said self-terminal has deviated from said route.

5. The communications-type navigation device as claimed in claim 1, further comprising:
   a voice outputting unit and voice recognizing unit,
   wherein said route guide talks to a user, with a voice, as to whether or not to request said information center to perform said route calculation to said destination place when said self-terminal has deviated from said route, and recognizes a user instruction by said voice recognizing unit, and determines, from said recognized result, whether or not to request said information center to perform said route calculation to said destination place.

6. A communications-type navigation device, comprising:
   a communicator which performs transmission/reception of data;
   a storage which stores said received data; and
   a map display which displays a map,
   wherein said communicator transmits, to an information center, a map request for specifying position information, scale information, and download area information, which is modified dynamically depending on a driving state of a vehicle, to download a larger area of the map when the vehicle is operated at high speed, said storage stores map data transmitted from said information center, said map display displaying said stored map data.

7. A communications-type navigation device comprising:
   a communicator which performs transmission/reception of map data;
   a storage which stores said received data which include at least one of wide area map data and detailed map data;
   a map display which displays a map,
   a map requesting unit which issues a map information request to said information center; and
   a driving state judging unit which differentiates a driving state of a vehicle,
   wherein said map requesting unit determines whether or not to communicate said map request according to an input to a prompt by a user in correspondence with said driving state of said vehicle acquired by said driving state judging unit, and
   wherein said communicator transmits, to an information center, a map request for specifying position information, scale information and downloaded area information, which is modified dynamically depending on the driving state of said vehicle indicated by said driving state judging unit, to download a larger area of the map when said vehicle is operated at high speed, said storage stores said map data transmitted from said information center, and said map display displays said stored map data.

8. The communications-type navigation device as claimed in claim 7, wherein said map requesting unit judges whether or not said driving state of said vehicle acquired by said driving state judging unit is an on-run state, said map requesting unit prohibiting said map request if said driving state is said on-run state.

9. The communications-type navigation device as claimed in claim 8, wherein said map requesting unit determines whether or not to issue said map request if said driving state of said vehicle has changed to a stop state.

10. The communications-type navigation device as claimed in claim 8, wherein, if said vehicle state is said on-run state and if a map needed for displaying an equally-scaled map on a present place's periphery has been not stored in said storing means, said map display displays a wide-area map stored in said storing means.

11. The communications-type navigation device as claimed in claim 7, wherein said communicator makes a comparison between an updating time-and-date of said map information recorded in said storing means and an updating time-and-date of map information corresponding to the same map recorded in said information center, and thereby monitors whether or not said map information has been updated.

12. The communications-type navigation device as claimed in claim 11, wherein said comparison is made between said updating time-and-date of said map in said information center and said updating time-and-date of said stored map, and, if said map in said information center is judged to have been updated, said map updating is notified with a picture or a voice.

13. The communications-type navigation device as claimed in claim 12, wherein, if said map in said information center has been updated, differential information of said updated map is received, and said map information is updated from said map information recorded in said storing means and said differential information.

14. The communications-type navigation device as claimed in claim 7, wherein said map display stores said map acquired by said communicator and, if map information at a predetermined position is requested, said means judges whether or not said map information has been stored in said storing means, said means, if stored, reading out said map information from said storing means, and if not stored, requesting said map to said information center.

15. The communications-type navigation device as claimed in claim 14, wherein said storing means judges whether or not there exists a storage area for storing said received map information and, if said storage area is judged to be lacking, said storing means deletes already existing map information therein in a sequence starting from its oldest reference time-and-date, and stores said received map information.

16. The communications-type navigation device as claimed in claim 7, wherein, said communicator transmits, to said information center, said map request for a map in a predetermined area including a predetermined point, and receives a data size of said map transmitted from said information center, said communicator also calculating, from said received data size, a communications fee needed for said communications, and outputting said communications fee with a voice or an image.

17. The communications-type navigation device as claimed in claim 7, wherein, said communicator transmits, to said information center, said map request for a map in a predetermined area including a predetermined point and measures its transmitted data amount, and receives said map information transmitted from said information center and measures its received data amount, and outputs, with a voice or an image, a communications fee needed for said communications from said transmitted data amount and said received data amount measured.

* * * * *